United States Patent
Romano et al.

(10) Patent No.: US 12,397,427 B2
(45) Date of Patent: *Aug. 26, 2025

(54) SYSTEMS AND METHODS FOR EFFICIENTLY MOVING A VARIETY OF OBJECTS

(71) Applicant: Berkshire Grey Operating Company, Inc., Bedford, MA (US)

(72) Inventors: Joseph Romano, Arlington, MA (US); William Chu-Hyon McMahan, North Cambridge, MA (US); Benjamin Cohen, Somerville, MA (US); Andrew Gauthier, Melrose, MA (US); Matthew T. Mason, Atlanta, GA (US); Thomas Wagner, Concord, MA (US); Prasanna Velagapudi, Pittsburgh, PA (US); Michael Dawson-Haggerty, Pittsburgh, PA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/384,892

(22) Filed: Oct. 30, 2023

(65) Prior Publication Data
US 2024/0173861 A1    May 30, 2024

Related U.S. Application Data

(63) Continuation of application No. 16/249,582, filed on Jan. 16, 2019, now Pat. No. 11,865,722.
(Continued)

(51) Int. Cl.
*B25J 9/16* (2006.01)
*B25J 15/00* (2006.01)
(Continued)

(52) U.S. Cl.
CPC .......... *B25J 9/1664* (2013.01); *B25J 9/1612* (2013.01); *B25J 15/0019* (2013.01);
(Continued)

(58) Field of Classification Search
CPC ........ G05B 2219/39468; B25J 15/0491; B25J 9/1664; B25J 15/019; B25J 15/0616
See application file for complete search history.

(56) References Cited

U.S. PATENT DOCUMENTS 2,853,333 A  9/1958  Littell
3,005,652 A  10/1961 Helm
(Continued)

FOREIGN PATENT DOCUMENTS

CN  102202837 A  9/2011
CN  104415868 A  3/2015
(Continued)

OTHER PUBLICATIONS

Notice on the Fourth Office Action, along with its English translation, issued by the China National Intellectual Property Administration in related Chinese Patent Application No. 201980008600.3 on Feb. 23, 2024, 12 pages.
(Continued)

*Primary Examiner* — Khoi H Tran
*Assistant Examiner* — Tristan J Greiner
(74) *Attorney, Agent, or Firm* — Gesmer Updegrove LLP

(57) ABSTRACT

A programmable motion system is disclosed that includes a dynamic end effector system. The dynamic end effector system includes a plurality of acquisition units that are provided at an exchange station within an area accessible by the programmable motion device, and a coupling system for coupling any of the plurality of acquisition units to an end effector of the programmable motion device such that any of the acquisition units may be automatically selected from the
(Continued)

exchange station and used by the programmable motion device without requiring any activation or actuation by the exchange station and without requiring any intervention by a human.

26 Claims, 26 Drawing Sheets

Related U.S. Application Data

(60) Provisional application No. 62/618,184, filed on Jan. 17, 2018.

(51) Int. Cl.
    *B25J 15/04*        (2006.01)
    *B25J 15/06*        (2006.01)

(52) U.S. Cl.
    CPC ........ *B25J 15/0441* (2013.01); *B25J 15/0491* (2013.01); *B25J 15/0616* (2013.01); *G05B 2219/39468* (2013.01)

(56) References Cited

U.S. PATENT DOCUMENTS

| | | | |
|---|---|---|---|
| 3,181,563 A | | 5/1965 | Griffen |
| 3,195,941 A | | 7/1965 | Morey |
| 4,512,709 A | * | 4/1985 | Hennekes ............ B25J 15/0491 901/41 |
| 4,604,787 A | * | 8/1986 | Silvers, Jr. ............ B23Q 7/046 414/730 |
| 4,635,985 A | | 1/1987 | Rooke |
| 4,653,793 A | | 3/1987 | Guinot et al. |
| 4,722,653 A | | 2/1988 | Williams et al. |
| 4,995,493 A | * | 2/1991 | Cotsman ............ B25J 15/0491 403/DIG. 1 |
| 5,017,084 A | * | 5/1991 | Lemelson ................ B25J 5/005 901/41 |
| 5,727,832 A | | 3/1998 | Holter |
| 5,860,900 A | * | 1/1999 | Dunning ................ B23Q 17/00 414/730 |
| 5,865,487 A | | 2/1999 | Gore et al. |
| 5,947,880 A | * | 9/1999 | Stagnitto ............ B25J 15/0491 483/54 |
| 5,993,365 A | * | 11/1999 | Stagnitto ............ B25J 15/0491 901/41 |
| 6,015,174 A | | 1/2000 | Raes et al. |
| 6,193,291 B1 | | 2/2001 | Morroney |
| 6,213,528 B1 | | 4/2001 | Hufken et al. |
| 6,244,640 B1 | | 6/2001 | Le Bricquer et al. |
| 6,382,692 B1 | | 5/2002 | Schmalz et al. |
| 9,266,237 B2 | | 2/2016 | Nomura |
| 9,486,926 B2 | | 11/2016 | Kawano |
| 9,492,923 B2 | | 11/2016 | Wellman et al. |
| 9,687,982 B1 | * | 6/2017 | Jules ..................... B25J 9/1612 |
| 9,981,379 B1 | | 5/2018 | Youmans et al. |
| 10,007,827 B2 | | 6/2018 | Wagner et al. |
| 10,500,735 B1 | | 12/2019 | Menon et al. |
| 10,576,641 B2 | | 3/2020 | Wagner et al. |
| 10,618,177 B2 | | 4/2020 | Wagner et al. |
| 10,625,432 B2 | | 4/2020 | Wagner et al. |
| 10,639,787 B2 | | 5/2020 | Wagner et al. |
| 10,668,630 B2 | | 6/2020 | Robinson et al. |
| 10,723,019 B2 | | 7/2020 | Wagner et al. |
| 10,850,402 B2 | | 12/2020 | Wagner et al. |
| 10,857,682 B2 | | 12/2020 | Wagner et al. |
| 10,913,159 B2 | | 2/2021 | Wagner et al. |
| 2002/0011735 A1 | | 1/2002 | Nagai et al. |
| 2002/0185575 A1 | | 12/2002 | Kalb |
| 2007/0006940 A1 | | 1/2007 | Perlman et al. |
| 2007/0287884 A1 | * | 12/2007 | Schena ................ A61B 34/70 600/104 |
| 2010/0078953 A1 | | 4/2010 | Ban et al. |
| 2010/0109360 A1 | | 5/2010 | Meisho |
| 2010/0175487 A1 | | 7/2010 | Sato |
| 2012/0319416 A1 | | 12/2012 | Ellis et al. |
| 2013/0147101 A1 | | 6/2013 | Cho |
| 2013/0203572 A1 | * | 8/2013 | Denkmeier ........ B23Q 11/0085 483/58 |
| 2015/0057793 A1 | | 2/2015 | Kawano |
| 2015/0328779 A1 | | 11/2015 | Bowman et al. |
| 2016/0089792 A1 | * | 3/2016 | Ojalehto .............. B25J 15/0441 901/50 |
| 2016/0167227 A1 | | 6/2016 | Wellman et al. |
| 2016/0176043 A1 | * | 6/2016 | Mishra ................ B25J 15/0483 901/9 |
| 2016/0258473 A1 | | 9/2016 | Koop et al. |
| 2017/0021499 A1 | | 1/2017 | Wellman et al. |
| 2017/0050315 A1 | | 2/2017 | Henry et al. |
| 2017/0057091 A1 | | 3/2017 | Wagner et al. |
| 2017/0080571 A1 | | 3/2017 | Wagner et al. |
| 2017/0080579 A1 | | 3/2017 | Wagner et al. |
| 2017/0087731 A1 | | 3/2017 | Wagner et al. |
| 2017/0106532 A1 | | 4/2017 | Wellman et al. |
| 2017/0120454 A1 | | 5/2017 | Ferguson et al. |
| 2017/0120455 A1 | | 5/2017 | Wagner et al. |
| 2017/0121113 A1 | | 5/2017 | Wagner et al. |
| 2017/0136632 A1 | | 5/2017 | Wagner et al. |
| 2017/0197316 A1 | | 7/2017 | Wagner et al. |
| 2017/0225330 A1 | | 8/2017 | Wagner et al. |
| 2018/0009113 A1 | | 1/2018 | Lauder et al. |
| 2018/0222061 A1 | * | 8/2018 | Alber ..................... B25J 15/04 |
| 2018/0281202 A1 | | 10/2018 | Brudniok et al. |
| 2019/0001505 A1 | | 1/2019 | Wagner et al. |
| 2019/0030727 A1 | | 1/2019 | Nagata et al. |
| 2019/0039240 A1 | | 2/2019 | Wagner et al. |
| 2019/0061174 A1 | | 2/2019 | Robinson et al. |
| 2019/0071260 A1 | | 3/2019 | Laverdiere |
| 2019/0102965 A1 | * | 4/2019 | Greyshock .......... G07F 11/1653 |
| 2019/0216644 A1 | | 7/2019 | Hershoff et al. |
| 2019/0217471 A1 | | 7/2019 | Romano et al. |
| 2019/0344447 A1 | | 11/2019 | Wicks et al. |
| 2019/0361672 A1 | | 11/2019 | Odhner et al. |
| 2020/0017317 A1 | | 1/2020 | Yap et al. |
| 2020/0030994 A1 | | 1/2020 | Wagner et al. |
| 2020/0070361 A1 | | 3/2020 | Menon et al. |
| 2021/0016454 A1 | | 1/2021 | Jeong et al. |
| 2021/0016456 A1 | | 1/2021 | Lei et al. |
| 2021/0039268 A1 | | 2/2021 | Anderson |
| 2021/0308874 A1 | | 10/2021 | Gealy et al. |
| 2021/0308875 A1 | | 10/2021 | Gealy et al. |
| 2022/0048707 A1 | | 2/2022 | Matl et al. |
| 2022/0048717 A1 | | 2/2022 | Sullivan et al. |
| 2022/0135346 A1 | | 5/2022 | Matsuoka et al. |
| 2022/0241962 A1 | | 8/2022 | Nguyen et al. |
| 2023/0081119 A1 | | 3/2023 | Rohanimanesh et al. |

FOREIGN PATENT DOCUMENTS

| | | | | |
|---|---|---|---|---|
| CN | 104802177 A | | 7/2015 | |
| CN | 111601686 A | | 8/2020 | |
| EP | 2708335 A1 | | 3/2014 | |
| WO | WO-2014040843 A1 | * | 3/2014 | ............. B25J 15/04 |
| WO | 2015162390 A1 | | 10/2015 | |
| WO | 2016100235 A1 | | 6/2016 | |
| WO | 2019143710 A1 | | 7/2019 | |

OTHER PUBLICATIONS

Communication pursuant to Article 94(3) EPC issued by the European Patent Office in related European Patent Application No. 19704111.4 on Feb. 16, 2022, 9 pages.

Communication pursuant to Rules 161(1) and 162 EPC issued by the European Patent Office in related European Patent Application No. 19704111.4 on Aug. 25, 2020, 3 pages.

Examiner's Report issued by the Innovation, Science and Economic Development Canada (Canadian Intellectual Property Office) in related Canadian Patent Application No. 3,088,655 on Aug. 20, 2021, 4 pages.

(56) References Cited

OTHER PUBLICATIONS

Examiner's Report issued by the Innovation, Science and Economic Development Canada (Canadian Intellectual Property Office) in related Canadian Patent Application No. 3,088,655 on Feb. 25, 2022, 4 pages.

Examiner's Report issued by the Innovation, Science and Economic Development Canada (Canadian Intellectual Property Office) in related Canadian Patent Application No. 3,088,655 on Aug. 24, 2023, 5 pages.

Final Office Action issued by the United States Patent and Trademark Office in related U.S. Appl. No. 16/249,582 on Aug. 12, 2022, 45 pages.

International Preliminary Report on Patentability issued by the International Bureau of WIPO in related International Application No. PCT/US2019/013833 on Jul. 21, 2020, 12 pages.

International Search Report and Written Opinion issued by the International Searching Authority on May 16, 2019 in related International Application No. PCT/US2019/013833, 15 pages.

Non-Final Office Action issued by the United States Patent and Trademark Office in related U.S. Appl. No. 16/249,582 on Mar. 15, 2022, 32 pages.

Non-Final Office Action issued by the United States Patent and Trademark Office in related U.S. Appl. No. 16/249,582 on Jan. 19, 2023, 46 pages.

Notice on the First Office Action, along with its English translation, issued by the China Intellectual Property Administration in related Chinese Patent Application No. 201980008600.3 on Oct. 11, 2022, 31 pages.

Notice on the Second Office Action, along with its English translation, issued by the China National Intellectual Property Administration in related Chinese Patent Application No. 201980008600.3 on Jun. 5, 2023, 34 pages.

Notice on the Third Office Action, along with its English translation, issued by the China National Intellectual Property Administration in related Chinese Patent Application No. 201980008600.3 on Nov. 25, 2023, 31 pages.

Vittor et al., "A Flexible Robotic Gripper for Automation of Assembly Tasks," Proceedings of the ASME Dynamic Systems and Control Division, vol. 2, 72-2, presented at the 2003 ASME International Mechanical Engineering Congress, Nov. 15-21, 2003, Washington, D.C., 7 pages.

* cited by examiner

SYSTEMS AND METHODS FOR EFFICIENTLY MOVING A VARIETY OF OBJECTS

PRIORITY

The present application is a continuation of U.S. patent application Ser. No. 16/249,582, filed Jan. 16, 2019, now U.S. Pat. No. 11,865,722, issued Jan. 9, 2024, which claims priority to U.S. Provisional Patent Application Ser. No. 62/618,184, filed Jan. 17, 2018, the disclosures of each of which are hereby incorporated by reference in their entireties.

BACKGROUND

The invention generally relates to programmable motion systems and relates in particular to end effectors for programmable motion devices (e.g., robotic systems) for use in object processing such as object sortation.

End effectors for robotic systems may be employed, for example, in certain applications to select and grasp an object, and then move the acquired object very quickly to a new location. End effectors should be designed to quickly and easily select and grasp an object from a jumble of dissimilar objects, and should be designed to securely grasp an object during movement. Certain end effectors, when used on different objects of different physical sizes, weights and materials, may have limitations regarding how securely they may grasp an acquired object during rapid movement, particularly rapid acceleration and deceleration (both angular and linear).

Many end effectors employ vacuum pressure for acquiring and securing objects for transport and/or subsequent operations by articulated arms. Other techniques for acquiring and securing objects involve electrostatic attraction, magnetic attraction, needles for penetrating objects such as fabrics, fingers that squeeze an object, hooks that engage and lift a protruding feature of an object, and collets that expand in an opening of an object, among other techniques. Typically, end effectors are designed as a single tool, such as for example, a gripper, a welder, or a paint spray head, and the tool is typically designed for a specific set of needs.

There remains a need however, for an end effector system in a programmable motion system that may select and grasp any of a wide variety of objects, and then move the acquired object very quickly to a new location.

SUMMARY

In accordance with an embodiment, the invention provides a programmable motion system that includes a dynamic end effector system. The dynamic end effector system includes a plurality of acquisition units that are provided at an exchange station within an area accessible by the programmable motion device, and a coupling system for coupling any of the plurality of acquisition units to an end effector of the programmable motion device such that any of the acquisition units may be automatically selected from the exchange station and used by the programmable motion device without requiring any activation or actuation by the exchange station and without requiring any intervention by a human.

In accordance with another embodiment, the invention provides a programmable motion system that includes a dynamic end effector system. The dynamic end effector system includes a plurality of vacuum cups through which a vacuum may be provided, and each of which may be attached to an end effector of the end effector system, wherein the programmable motion system is capable of accessing any of the plurality of vacuum cups, and a coupling system for coupling any of the plurality of vacuum cups to the end effector of the end effector system of the programmable motion device.

In accordance with a further embodiment, the invention provides a programmable motion system that includes a dynamic end effector system. The dynamic end effector system includes a plurality of acquisition units that are provided within access to the programmable motion device on an acquisition unit rack, the acquisition unit rack being movable in at least two mutually orthogonal directions.

In accordance with yet a further embodiment, the invention provides a method of providing the processing of objects using a programmable motion system. The method includes the steps of providing a plurality of vacuum units, each of which may be attached to an end effector of the end effector system, and each of which may provide a vacuum therethrough, accessing any of the plurality of vacuum units, coupling any of the plurality of vacuum units to the end effector of the end effector system of the programmable motion device, and using the coupled vacuum unit to grasp and move an object by the programmable motion device.

BRIEF DESCRIPTION OF THE DRAWINGS

The following description may be further understood with reference to the accompanying drawings in which.

Figure 1:
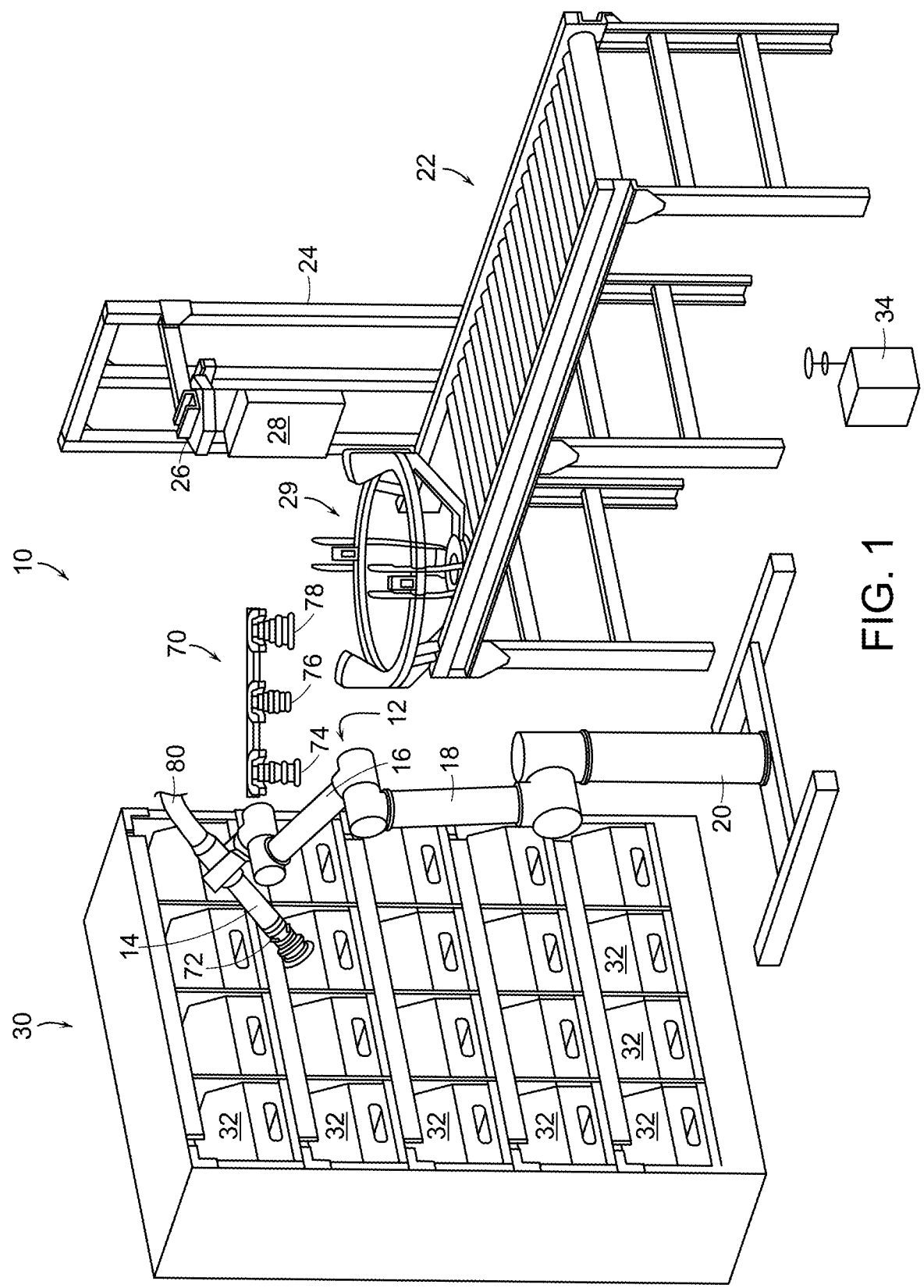
FIG. 1 shows an illustrative diagrammatic view of an object processing system in accordance with an embodiment of the present invention.

The drawings are shown for illustrative purposes only.

DETAILED DESCRIPTION

In accordance with an embodiment the invention provides a programmable motion system for moving objects for processing, such as sortation and order fulfillment. In applications such as order fulfillment, objects are collected into heterogeneous sets and need to be processed into appropriate groupings. In particular, individual objects need to be identified (e.g., by perception systems) and then routed to object-specific locations. The described system reliably automates the grasping and movement of such objects by employing both a robotic arm and versatile gripping systems. In accordance with various embodiments, the perception units (e.g., cameras or scanners) may look for a variety of codes such as indicia, e.g., barcodes, radio frequency identification (RFID) tags, Stock Keeping Unit (SKU) codes, Universal Parcel Codes (UPC), low wavelength IR (LWIR), as well as invisible barcodes and digital watermarks such as Digimarc DWCode, etc.

Sorting for order fulfillment is one application for automatically identifying objects from a heterogeneous object stream. Barcode scanners have a wide variety of uses including identifying the Stock Keeping Unit of an article, or tracking parcels. The system described herein may have many uses in the automatic identification and processing, e.g., sortation, of objects.

Such a system automates part of the sorting process in conjunction with a robotic pick and place system, and in particular, the step of grasping and carrying objects. A robotic arm, for example, picks an object from a bin, places the object in front of (or drops an object into) a scanner, and then, having obtained identification information for the object (such as a barcode, QR codes, UPC codes, other identification codes, information read from a label on the object, or assessed size, weight and/or shape information), routes the object toward the appropriate bin or shelf location by either moving the object itself, or placing the object in or on a conveyance system. Since certain scanners employ cameras or lasers to scan 1D or 2D symbologies printed on labels affixed to objects, the barcodes must be visible to the scanner's sensors for successful scanning in order to automatically identify items in a heterogeneous stream of arbitrary objects, as in a jumbled set of objects found in a bin.

Further applications for grasping systems of the invention include sortation for a wide variety of applications, including order fulfillment, collection of objects for shipping, and collection of objects for inventory purposes etc. Further, such grasp planning systems of the invention may be used for loading break-packs (organized packages for later breaking apart at a different location), palletization (loading pallets), de-palletization, truck loading, truck unloading etc. As used herein, the term "destination locations" involves locations at which objects are placed for any purpose, not necessarily a final destination, and not necessarily for sortation for order fulfillment.

In accordance with various embodiments, therefore, the invention provides a method for determining the identity of an object from a collection of objects, as well as a method for perceiving the information regarding an object employing one or more perception units (cameras or scanners), and a robotic arm with an end-effector for holding the object. The invention further provides a method for determining a sequence of placements of a robot end-effector so as to minimize the time it takes a configuration of one or more cameras or scanners to successfully scan an object, and a method for scanning the identification information (such as a barcode, QR codes, UPC codes, other identification codes, information read from a label on the object, or assessed size, weight and/or shape information) of an object by employing a scanner as an end-effector on a robotic arm.

An important aspect is the ability to identify identification or mailing information for the object (such as a barcode, QR codes, UPC codes, other identification codes, information read from a label on the object, or size, weight and/or shape information) of objects by employing a programmable motion device such as a robot arm, to pick up individual objects and place them in front of one or more scanners or to drop or place the object into a scanner. In accordance with other embodiments, the programmable motion device may include a parallel arm robot (Delta-type arm) or a linear indexing pick and place system. Certain convention scanning systems, for example, may be unable to see labels or barcodes on objects that are presented in a way that this information is not exposed or visible.

Important components of an automated processing system in accordance with an embodiment of the present invention are shown in FIG. 1. FIG. 1 shows a programmable motion system 10 that includes an articulated arm 12 that includes an end effector 14 and articulated sections 16, 18 and 20. The articulated arm 12 selects objects from an input area such as a conveyor 22 that are either in a bin on the conveyor 22, or are on the conveyor itself. A stand 24 includes an attached perception unit 26 that is directed toward the conveyor from above the conveyor 22. The perception unit 26 may include, for example, a 2D or 3D camera, or a scanner such as a laser reflectivity scanner or other type of bar-code reader, or a radio frequency identification (RFID) scanner. The perception unit 26 is positioned to acquire perception data regarding objects that are provided on a conveyor 22 or in a bin that is on the conveyor 22. Based on the perception data, the system 10 determines one or more grasp locations on an object, and directs the end effector 14 on the articulated arm 12 to grasp the object.

Figure 2:
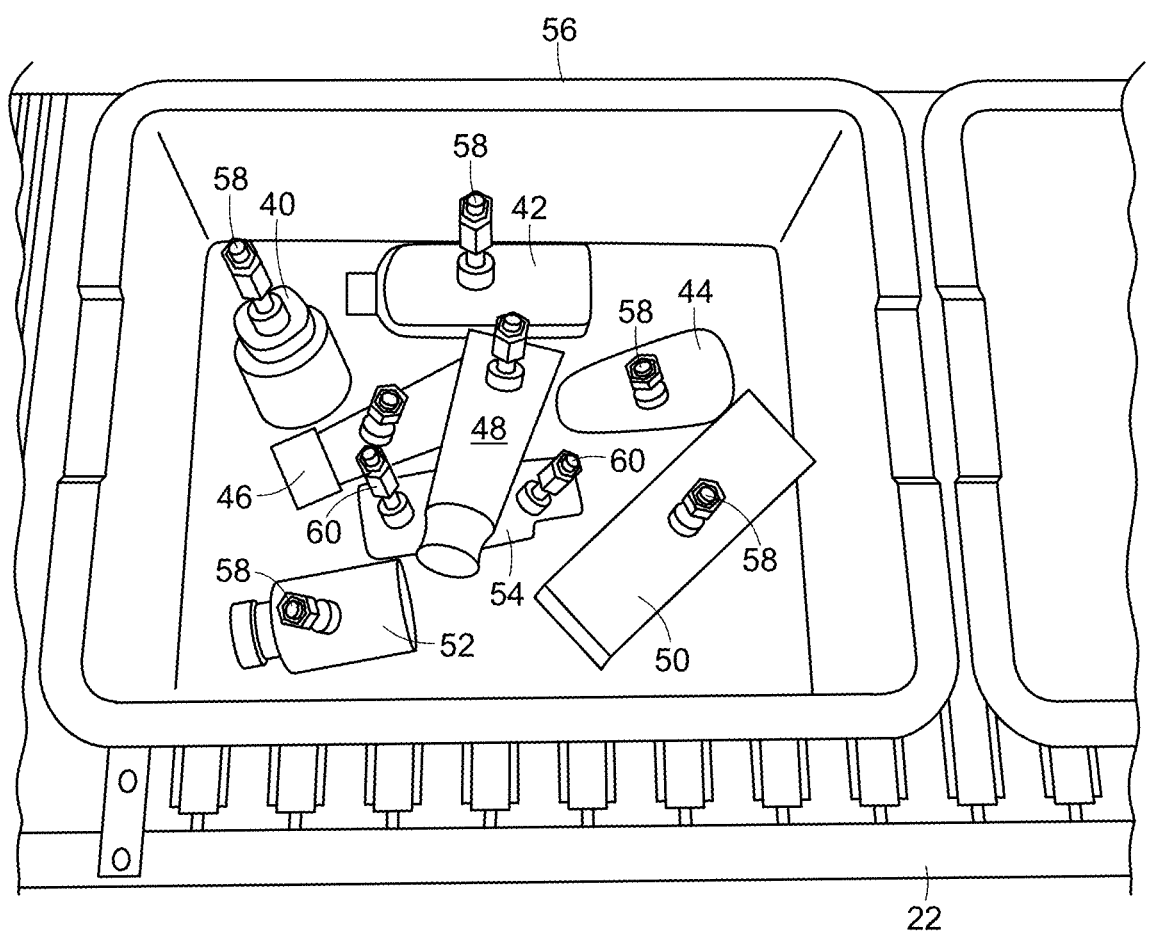
FIG. 2 shows an illustrative diagrammatic view of a view from a perception system of the system of FIG. 1 directed down into a bin on a conveyor.

Images taken by the perception unit 26 may be displayed on a touch input screen 28 so that persons in the environment may interact with the system 10, e.g., by confirming, rejecting or proposing, possible grasp locations on objects, based on which the system 10 may undergo machine learning (e.g., in processor 34) with regard to the objects. FIG. 2, for example, shows objects 40, 42, 44, 46, 48, 50, 52, 54 in a bin 56 on the conveyor 22. Associated with each object are possible grasp locations and orientations that the gripper may use to grasp the objects. While certain grasp locations 58 are good, others, such as 60 are not good grasp locations for a variety of reasons, such as for example, that the object is presently blocked by other objects. Either with or without prompts, a human may enter information through the interactive touch input screen regarding which grasp locations proposed by the system 10 are good, which grasp locations proposed by the system 10 are bad, and/or which grasp locations not proposed by the system 10 would be advised.

Figure 3:
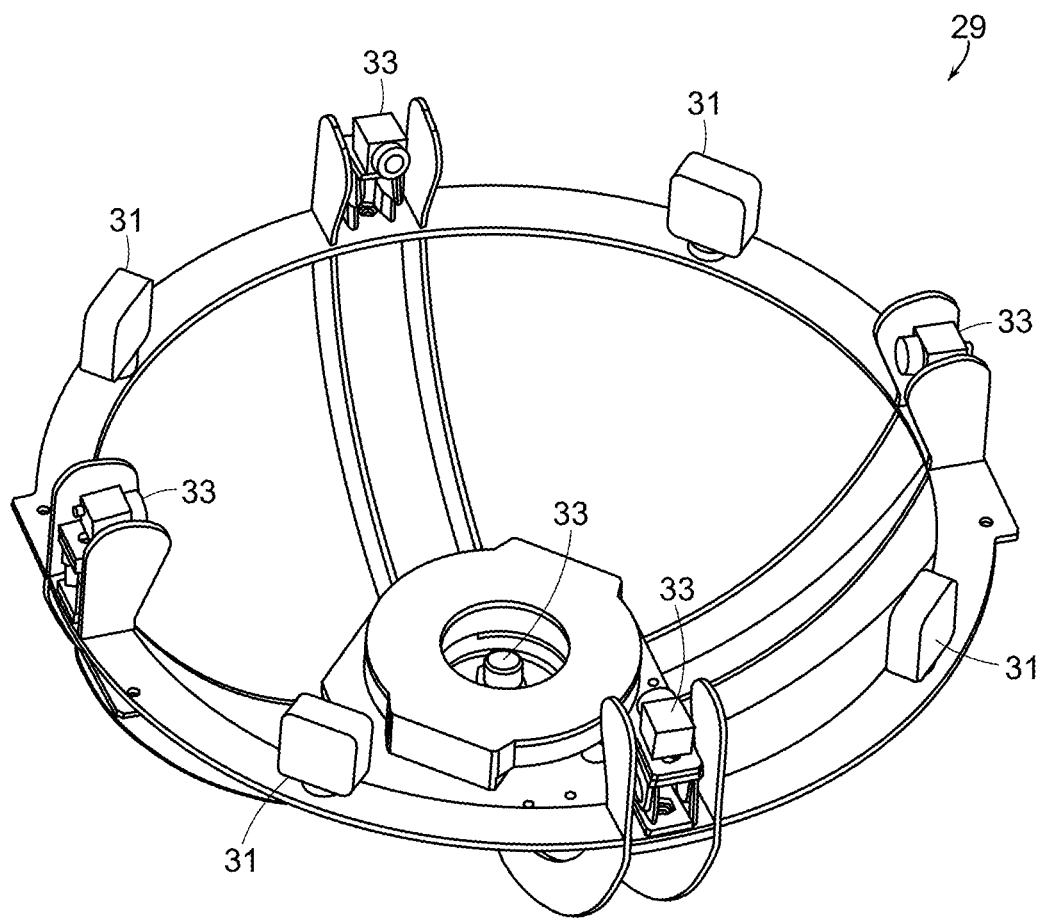
FIG. 3 shows an illustrative diagrammatic view of a secondary perception system of the system of FIG. 1.

The system 10 provides that when an object has been grasped by the end effector 14 of the articulated arm 12, the end effector 14 may present the object to a perception station 29. As further shown in FIG. 3, the perception station 29 includes a plurality of light sources 31 (e.g., LEDs, or fluorescent, phosphorescent or incandescent lights), as well as a plurality of perception units 33 (e.g., scanners or cameras) for reading barcodes, radio frequency identification (RFID) tags, Stock Keeping Unit (SKU) codes, Universal Parcel Codes (UPC), low wavelength IR (LWIR) information or invisible barcodes and digital watermarks. While the perception unit 26 may have detected any such label or code upon grasp planning if the label or code was facing the perception unit 26, the additional perception units 33 at the perception station 29 provide views of all remaining sides of the object when the end effector 14 positions the object within the perception station 29.

Having identified a code or indicia, the processing system 34 then pulls routing information regarding the object, and the articulated arm 12 then moves the object using the end effector 14 to an appropriate location 32 of a bank of sortation locations 30. The end effector 14 further includes an acquisition unit 72 (such as a vacuum unit, e.g., a vacuum cup) for contacting and grasping the objects. In an embodiment, the acquisition unit 72 may be in the form of a flexible bellows, and may include a vacuum line 80 attached to the end effector 14 for providing a vacuum source at the mouth of the flexible bellows.

Figure 4:
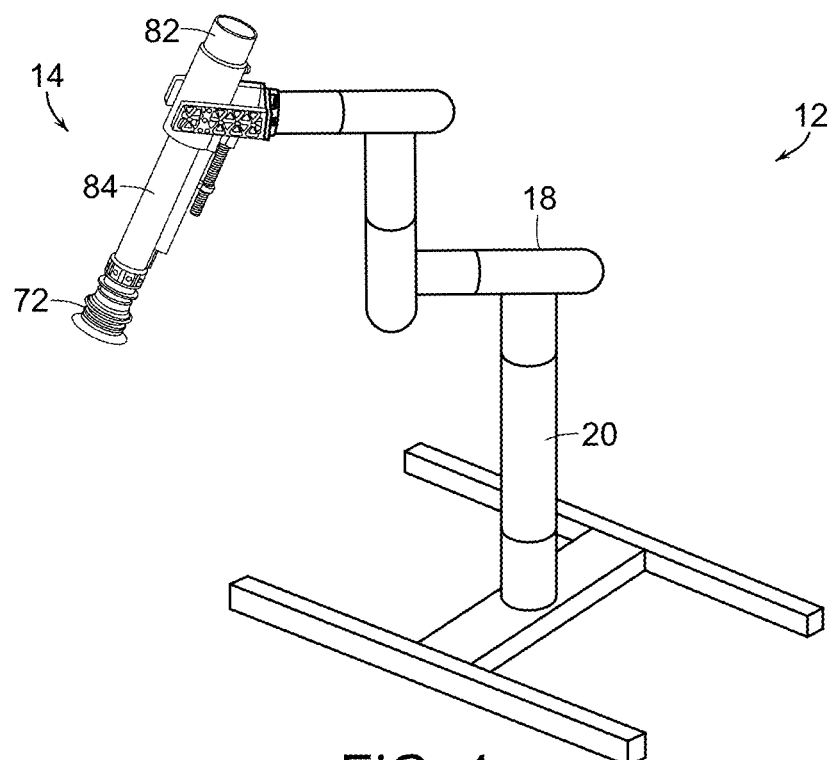
FIG. 4 shows an illustrative diagrammatic view of a programmable motion device of the system of FIG. 1 including articulated arm sections and an end effector section.
Figure 5:
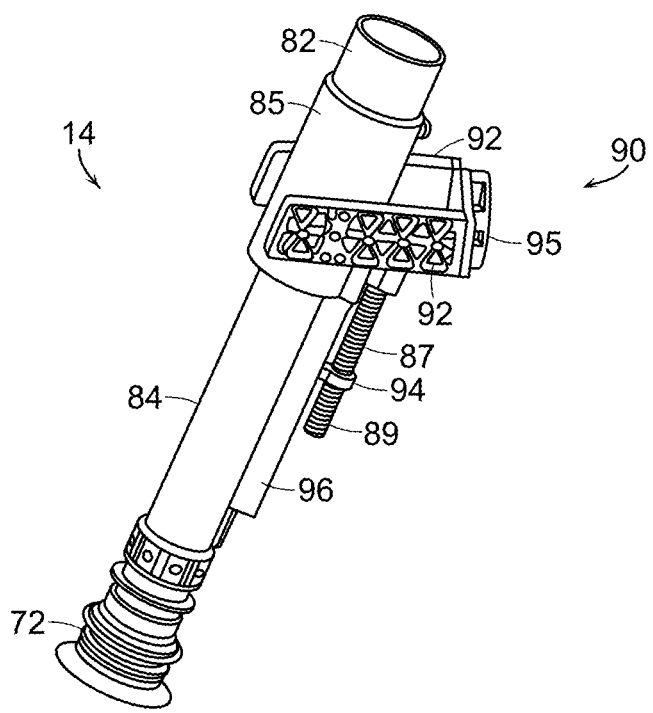
FIG. 5 shows an illustrative diagrammatic view of the end effector section of the programmable motion device of FIG. 4.

As further shown in FIG. 4, the acquisition unit 72 is coupled to a conduit 84, the other end of which 82 is coupled to the vacuum line 80 (shown in FIG. 1). The conduit 84 is adapted to linearly slide into and out of an end effector base 85 in relatively small amounts. The end effector 14 provides the vacuum through the conduit to the acquisition unit 72. The end effector 14 is attached to the articulated arm via a coupling mechanism 90 that includes clamp arms 92. A slidable anchor 94 is attached to the conduit 84 such that as the conduit 84 slides in and out of the end effector base 85, the anchor moves along a track 96. When the anchor 94 (and the conduit 84) moves toward the base 85, the upper spring 87 is compressed, and then the anchor 94 moves away from the base 85, the lower spring 89 is compressed. The end effector 14 thereby permits the end acquisition unit 72 to move toward and away from the base 85 against the forces of springs in either direction to accommodate axial forces that are applied to the acquisition unit 72 during use. The coupling mechanism 90 includes an attachment plate 95 for coupling to the robotic arm. In further embodiments, the coupling mechanism may also include a low profile load plate (e.g., a load cell or a torque force sensor system) for monitoring load forces on the acquisition unit 72.

Figure 6:
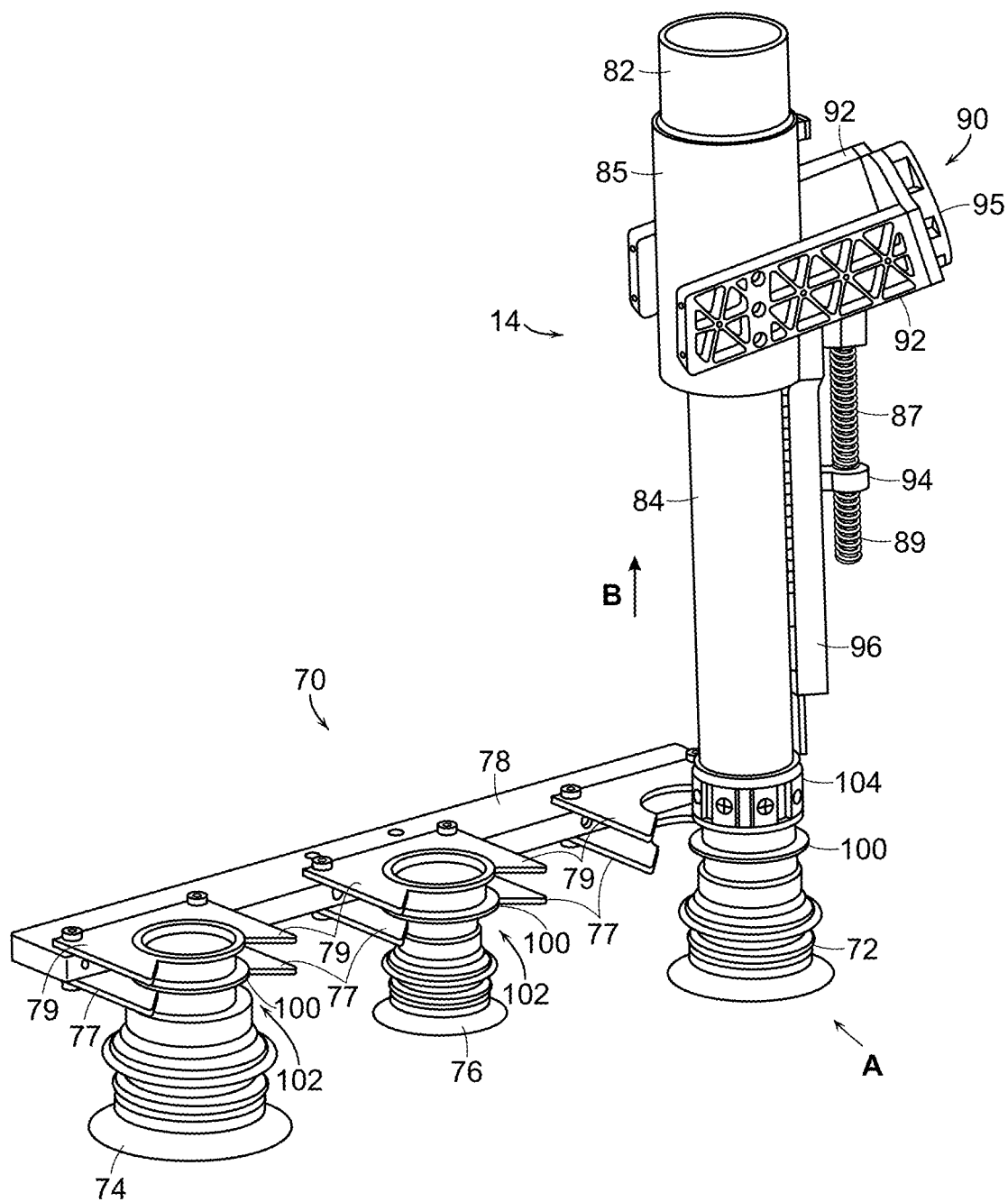
FIG. 6 shows an illustrative diagrammatic view of an exchange station of the system of FIG. 1.
Figure 7:
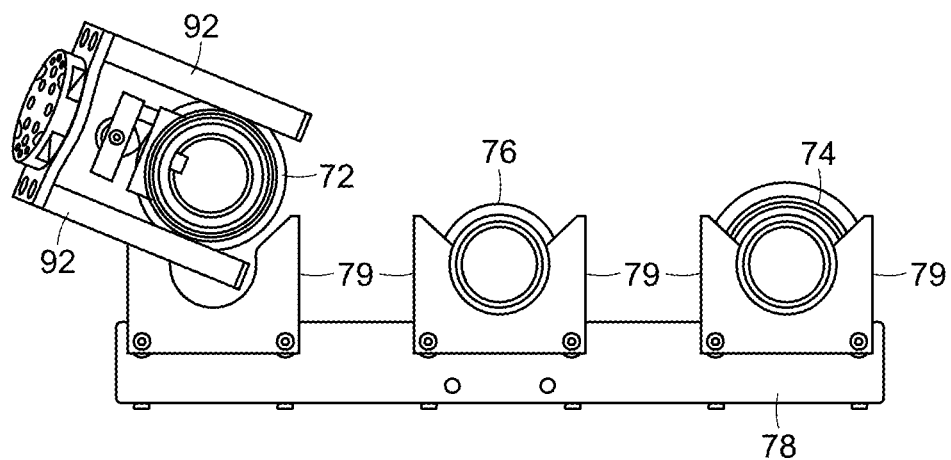
FIG. 7 shows an illustrative diagrammatic top view of the exchange station of FIG. 5.
Figure 8:
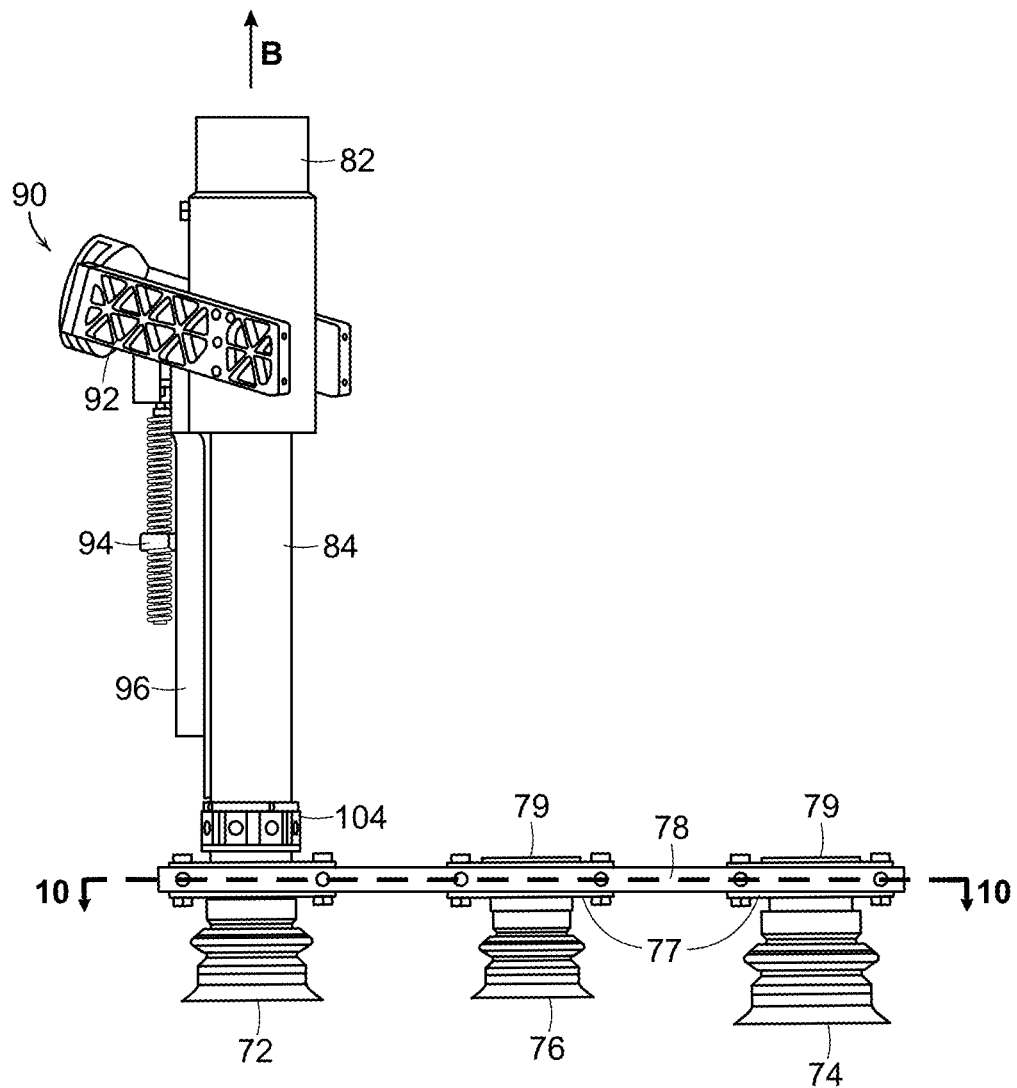
FIG. 8 shows an illustrative diagrammatic side view of the exchange station of FIG. 6.

With reference to FIG. 6, the system may further provide a plurality of acquisition units (e.g., 74, 76) in addition to unit 72 that are suited for grasping different objects. In certain embodiments, the acquisition units are vacuum cups that provide passage of a vacuum therethrough. As an example, the different acquisition units 72, 74, 76 may each be a different size, and be suited for grasping different objects having differently sized flat areas (for grasping). As further shown with reference to FIGS. 7 and 8, a rack 78 on which the additional acquisition units 74, 76 are provided, may include sets of opposing brackets 77, 79, between which a rim 100 on each acquisition unit may be positioned. When each acquisition unit 74, 76 is held by the rack 78, an undersurface 102 of a rim 100 rests against a lower bracket of the respective pair of brackets 77, 79.

In accordance with certain embodiments, therefore, the invention provides a programmable motion system including a dynamic end effector system. The dynamic end effector system includes a plurality of acquisition units and coupling means. The plurality of acquisition units are provided at an exchange station within an area accessible by the programmable motion device. The coupling means is for coupling any of the plurality of acquisition units to an end effector of the programmable motion device such that any of the acquisition units may be automatically selected from the exchange station and used by the programmable motion device without requiring any activation or actuation by the exchange station and without requiring any intervention by a human. While a human may place a new actuation unit onto the rack, and may then inform the system as to which actuation unit is placed on the rack and where it is placed, this is not required. The system may originally be set up such that the system is programmed to know which actuation units began in which positions (and thereafter track any movement via exchanges). In other embodiments, the vacuum cups may have unique physical or magnetic features that may be detected by the end effector.

The exchange station (such as the rack 78) is therefore inactive in that the system does not require the exchange station to actively open or close any latches, or move any carousels, etc. The programmable motion system knows where the rack is positioned, and knows and monitors which actuation units (e.g., vacuum cups) are on the rack and where each is positioned. The programmable motion system may therefore process the objects while switching vacuum cups automatically depending on input from the perception unit(s) 26 and/or 29.

Figure 9A:
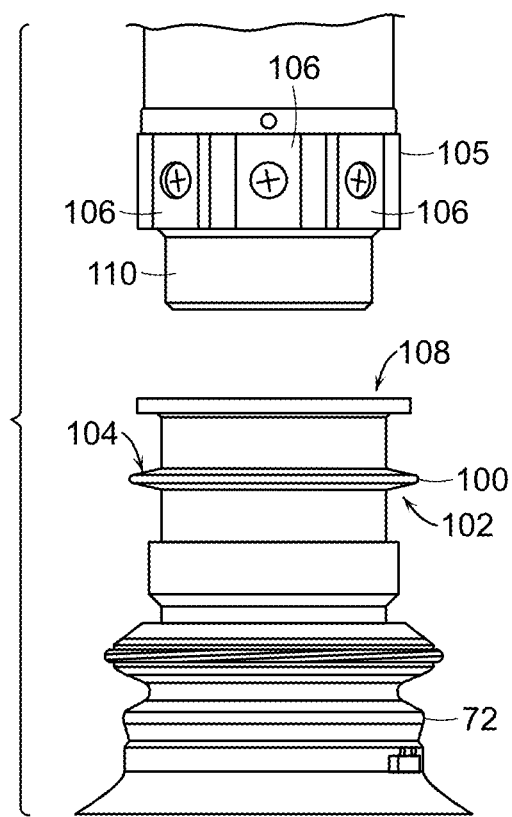
FIGS. 9A and 9B show illustrative diagrammatic views of an end effector and an acquisition unit uncoupled (FIG. 9A) and coupled (FIG. 9B)

When an acquisition unit (e.g., 72) is returned to the rack 78, the unit is moved in a direction as generally shown at A in FIG. 6 such that the rim 100 moves freely between the lower 77 and upper 79 brackets of a receiving station. Once the rim 100 is between the brackets 77, 79, the end effector 14 is moved upward (as shown at B in FIG. 8). The conduit 84 includes a collar 105 having a plurality of magnets 106 (of similar polarity orientation), and the magnetic field provided by the magnets 106 retains the metal end 108 of the acquisition unit around a mounting post 110 (as further shown in FIG. 9A). When the end effector 14 is moved upward (again, as shown at B in FIG. 8), the upper-side 104 of the rim 100 is stopped against the upper 79 of the pair of brackets, and the magnetic force causing the end 108 of the acquisition unit 72 to remain attached to the post 110, is overcome. The end effector then moves away from the acquisition unit 72, leaving the acquisition unit suspended from the underside 102 of the rim 100.

Figure 9B:
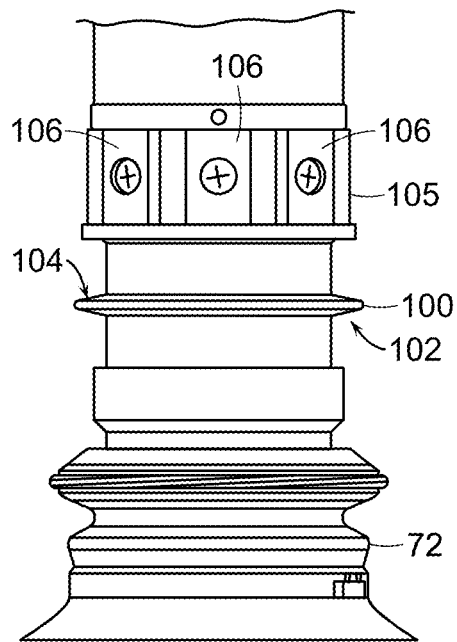
Figure 10:
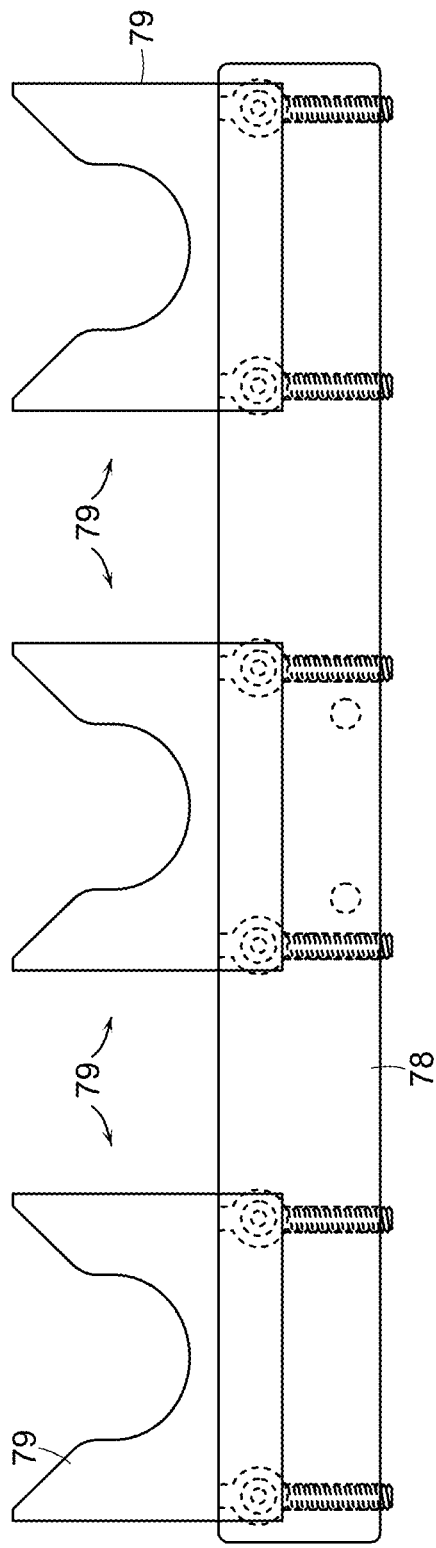
FIG. 10 shows an illustrative diagrammatic top view of the exchange station of FIG. 6 without the acquisition units.
Figure 11:
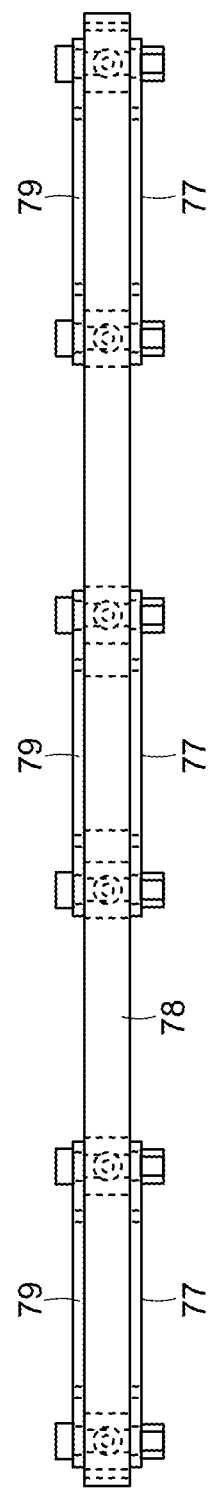
FIG. 11 shows an illustrative diagrammatic side view of the exchange station of FIG. 10.

With reference again to FIGS. 9A and 9B, the end effector 14 may then attach a new acquisition unit to the end effector by lowering the end of the conduit 84 with the magnets 106 into an open ferromagnetic end 108 of the acquisition unit to secure the acquisition unit to the mounting post 110 at the end of the conduit 84. The end effector is then moved in a direction opposite that shown at A in FIG. 6 to move the acquisition unit away from the rack 78 so that it may be used in processing objects as discussed above. In accordance with various embodiments, the magnets may be provided on either or both elements, and either unit may be fitted over the other element. FIGS. 10 and 11 further show top and side views of the rack 78 including the pairs of brackets 77, 79. The system 10 therefore, permits that articulated arm may select different acquisition units depending on a variety of factors such as the objects being presented to the perception unit 26.

Figure 12A:
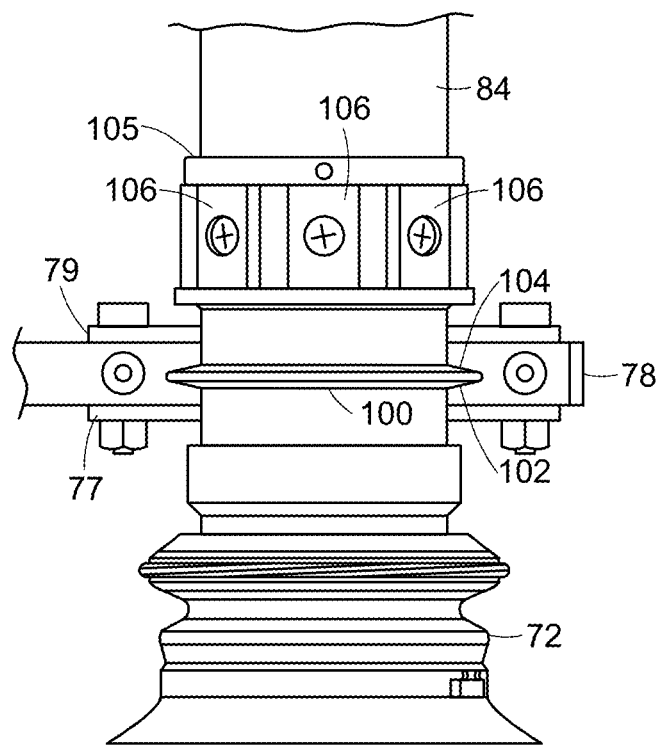
FIGS. 12A-12D show illustrative diagrammatic views of an acquisition unit being exchanged from an end effector to an exchange station in accordance with an embodiment of the present invention.
Figure 12B:
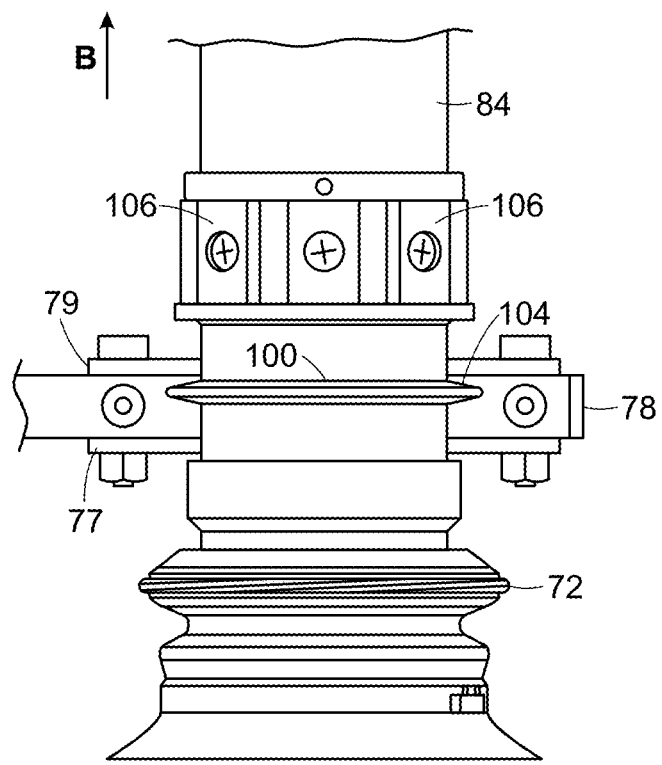
Figure 12C:
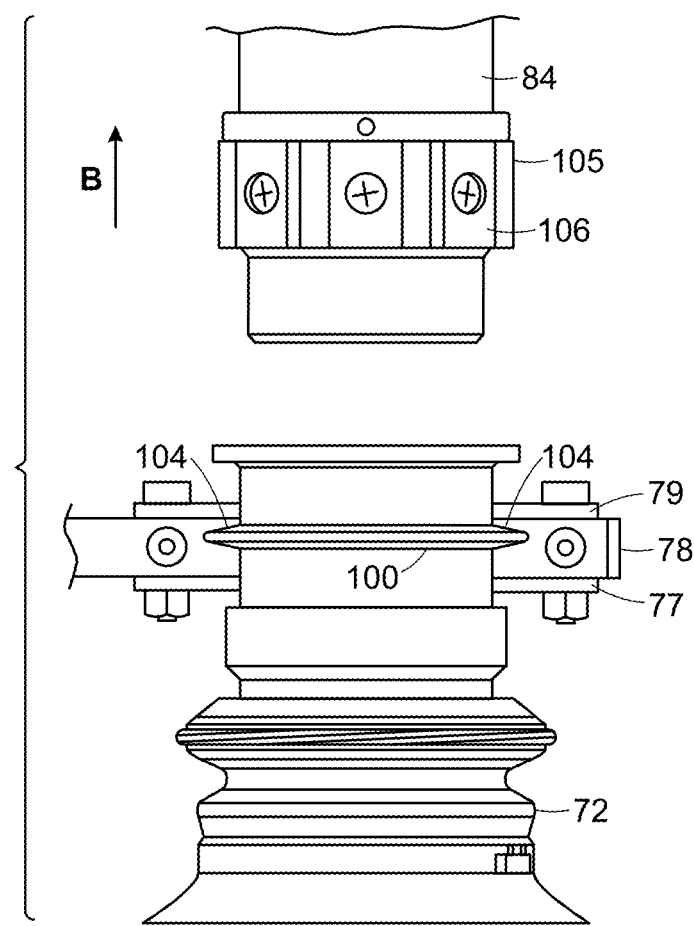
Figure 12D:
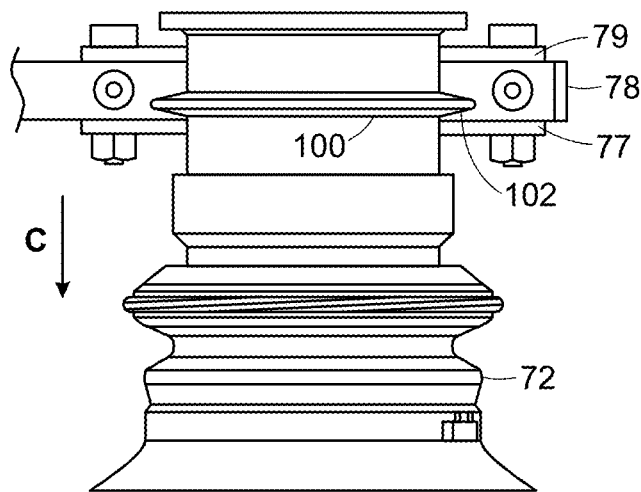

The interaction of the brackets 77, 79 and the rim 100 is further shown in FIGS. 12A-12D, which show the acquisition unit 72 being returned to the rack. In particular, the acquisition unit 72 is moved (again in the direction as shown at A in FIG. 6) onto the rack such that the rim 100 is positioned between the brackets 77, 79. The end effector is then lifted in the direction as shown at B in FIGS. 12B and 12C, and the upper-side 104 of the rim 100 contacts and is stopped by the underside of the upper bracket 79. The force of movement of the end effector in direction B is then caused to exceed the retention force created between the magnets 106 and the ferromagnetic end 108 of the acquisition unit 72. The conduit 84 is thereby separated from the acquisition unit 72 (as shown in FIG. 12C), and the acquisition unit 72 then drops slightly such that the underside 102 of the rim 100 is held by the lower bracket 77 (FIG. 12D).

Figure 13:
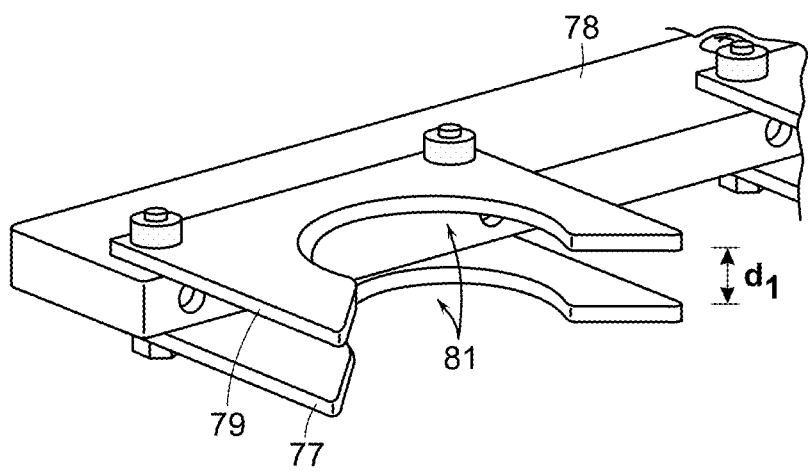
FIG. 13 shows an illustrative diagrammatic view of a portion of the exchange station of FIG. 10.

FIG. 13 shows a view of a portion of the brackets 78 including the lower (77) and upper (79) brackets. The curved shape 81 is designed to match the circular shape of the acquisition units 72, 74, 76, and the opening distance ($d_1$) between the brackets 77 and 79 is designed to easily accommodate the rim 100 of an acquisition unit 72, 74, 76.

Figure 14:
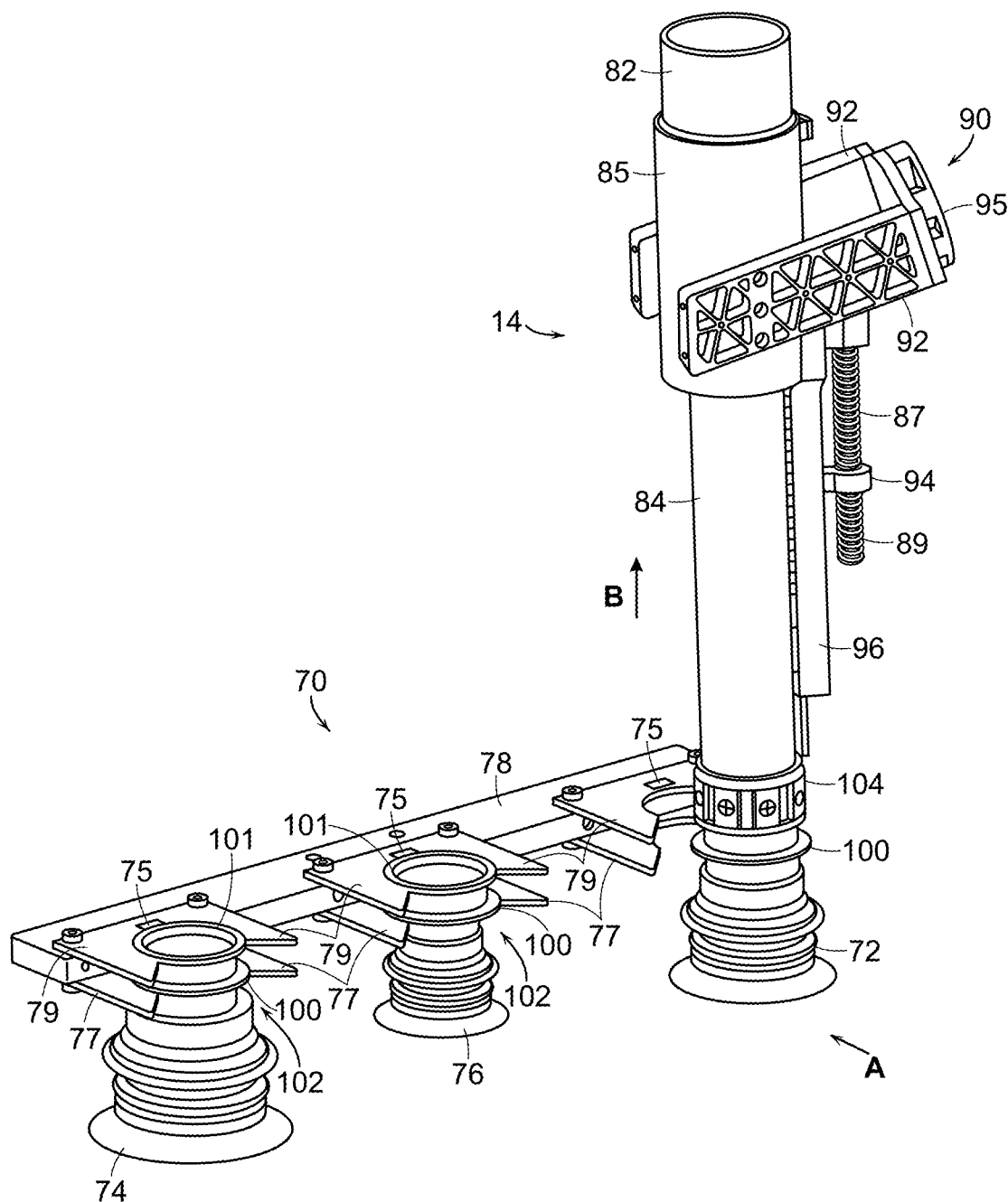
FIG. 14 shows an illustrative diagrammatic view of an exchange station in accordance with another embodiment of the present invention that includes passive retention magnets.
Figure 15:
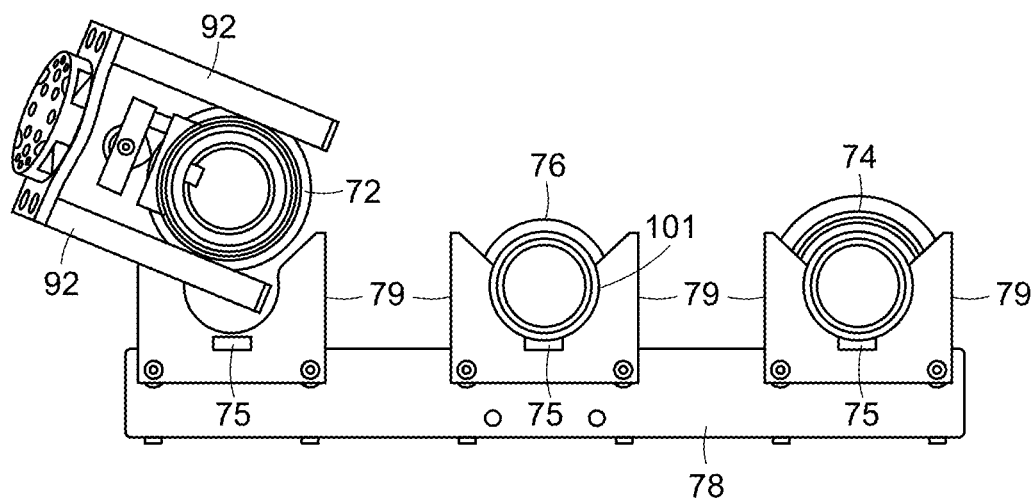
FIG. 15 shows an illustrative diagrammatic top view of the exchange station of FIG. 14.

FIG. 14 shows a system in accordance with a further embodiment of the present invention similar to that shown in FIG. 6, where like reference numerals indicate similar components. The system provides a plurality of acquisition units (e.g., 74, 76) in addition to unit 72 (that is shown coupled to the end effector 14) that are suited for grasping different objects. In certain embodiments, the acquisition units are vacuum cups that provide passage of a vacuum therethrough. The system of FIG. 14 further includes magnets 75 on the bracket 78, and the magnets 75 are in close contact with the top rim 101 of the acquisition units (72, 74, 76) when an acquisition unit is engaged on the bracket 78. Since the top rim 101 of the acquisition units are ferromagnetic, the magnets 75 act as passive retention systems that keep the acquisition units (72, 74, 76) from sliding or vibrating off of the rack 78. FIG. 15 shows a plan view of the rack 78 with the magnets 75, and shows the top rim 101 of the acquisition units 74, 76 fitting over the magnet 75 when engaged with the rack 78.

Figure 16:
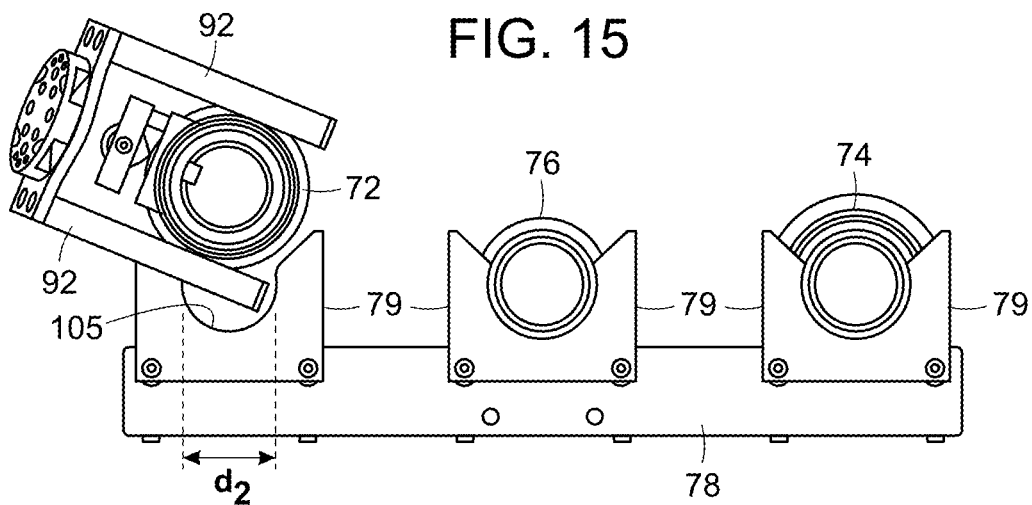
FIG. 16 shows an illustrative diagrammatic top view of an exchange station in accordance with a further embodiment of the present invention that involves a friction fit between the brackets and the acquisition units.
Figure 17:
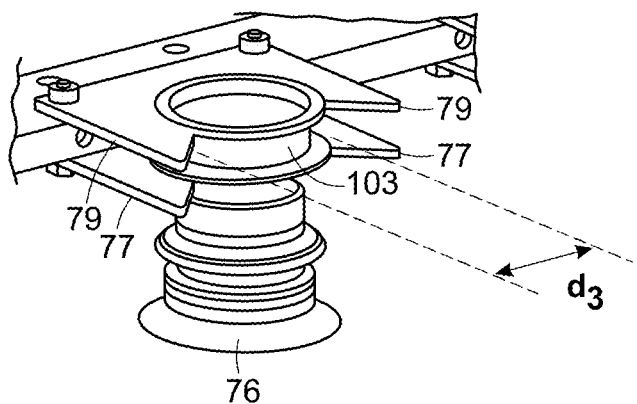
FIG. 17 shows an illustrative diagrammatic of an acquisition unit engaged with the exchange station of FIG. 16.

FIGS. 16 and 17 show a further passive retention system that acts to maintain the acquisition units on the rack 78. The diameter ($d_2$) of the arced opening in each bracket 77, 79 is designed to be the same as or within 0.5% of the diameter (ds) (e.g., de may be 0.5% smaller than ds) of the neck section 103 of each acquisition unit. In accordance with further embodiments, the inner surface 105 of the brackets 77, 79 may be coated with a resilient material such as rubber. The rubber allows a same size diameter or even larger sized diameter acquisition unit to be firmly held by the rack 78 since the rubber compresses and firmly engages the metal neck of the acquisition unit.

Figure 18:
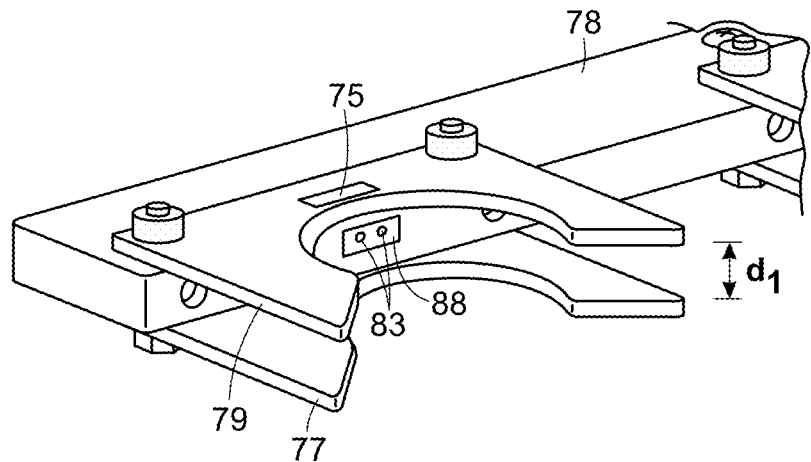
FIG. 18 shows an illustrative diagrammatic view of a portion of an exchange station in accordance with a further embodiment of the present invention that further includes an acquisition unit identification perception system.
Figure 19:
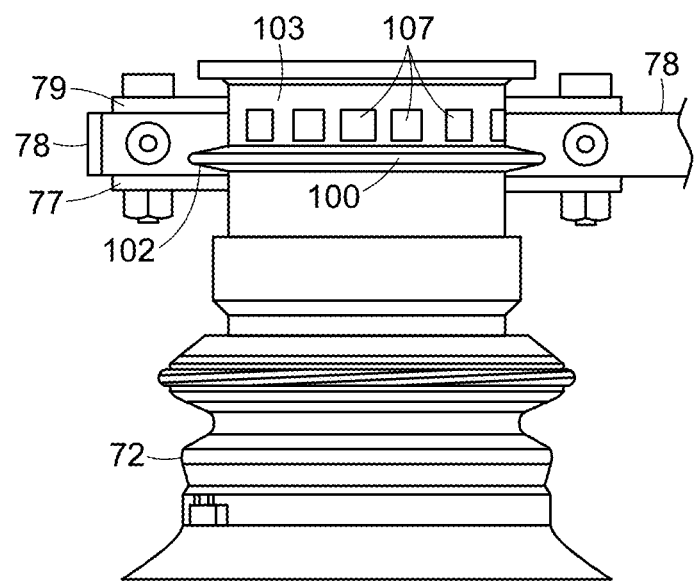
FIG. 19 shows an illustrative diagrammatic side view of an acquisition unit with identifying indicia engaged with the exchange station of FIG. 18.

In accordance with a further embodiment and with reference to FIGS. 18 and 19, the rack 78 may further include a detection unit 88 that includes one or more perception systems 83 (e.g., cameras or scanners), that detect identifying indicia 107 on the neck section 103 of each acquisition unit. The identifying indicia may be different for each acquisition unit, and the system may thereby confirm the identity and location of each acquisition unit on the rack.

Figure 20:
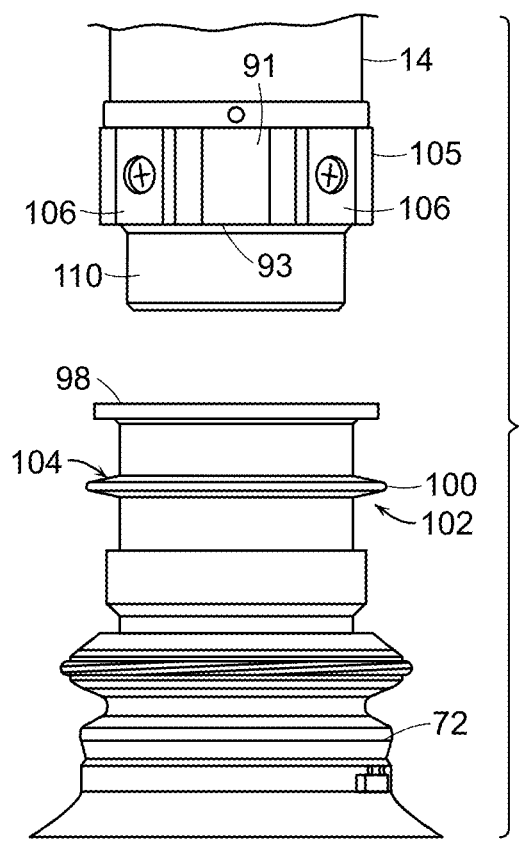
FIG. 20 shows an illustrative diagrammatic side view of an end effector and an acquisition unit in accordance with a further embodiment of the present invention that includes an acquisition unit presence detection system.
Figure 21:
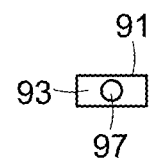
FIG. 21 shows an illustrative diagrammatic bottom view of the acquisition unit presence detection system of FIG. 20.
Figure 22:
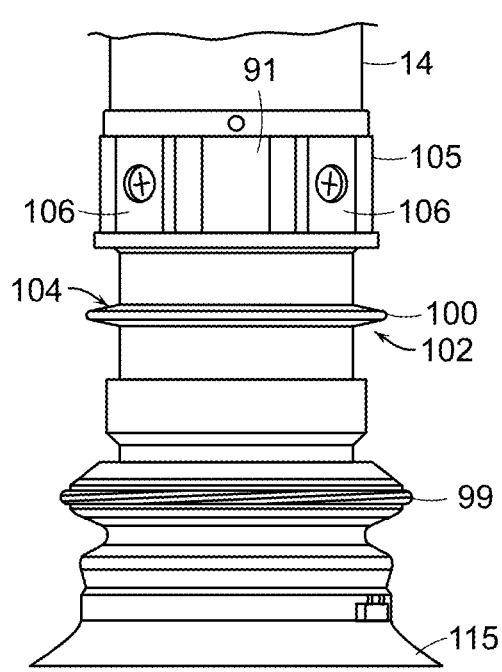
FIG. 22 shows an illustrative diagrammatic side view of the end effector and acquisition unit of FIG. 20 coupled together.
Figure 23:
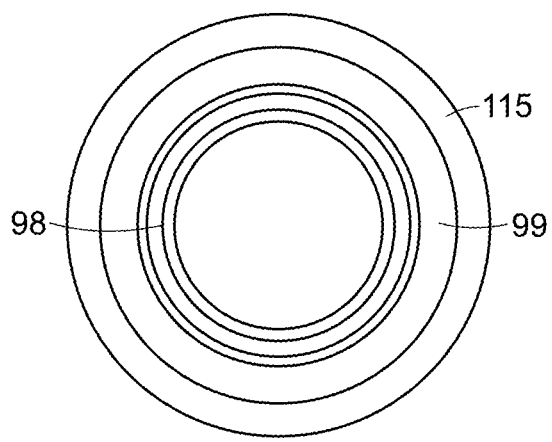
FIG. 23 shows an illustrative diagrammatic top view of the acquisition unit of FIG. 20.

FIGS. 20-23 show an end effector with an acquisition unit presence detection system. In particular, the end effector 14 includes a detection unit 91 (e.g., a photo-detection unit) that includes on a bottom surface 93 thereof, a detector 97 (e.g., a camera, photo-optic detector or magnetic detector) that detects the presence (or absence) of a top surface 98 of the acquisition unit. FIG. 20 shows a side view of the detection unit and FIG. 21 shows a bottom view of the detection unit as it faces the acquisition unit. FIG. 22 shows the acquisition unit coupled to the end effector, and FIG. 23 shows a top view of the acquisition unit, with the top surface 98 as well as the bellows portion 99 and the opening portion 115 of the end effector. The system may thereby confirm that an acquisition unit is either coupled to the end effector, or has been successfully returned to the rack and is no longer on the end effector.

Figure 24:
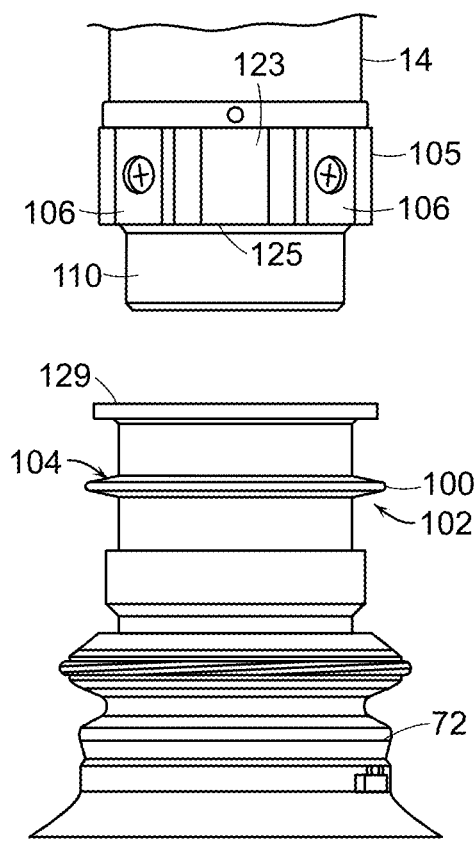
FIG. 24 shows an illustrative diagrammatic side view of an end effector and an acquisition unit in accordance with a further embodiment of the present invention that includes an acquisition unit identity detection system.
Figure 25:
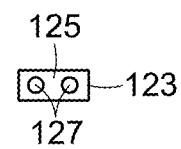
FIG. 25 shows an illustrative diagrammatic bottom view of the acquisition unit presence detection system of FIG. 24.
Figure 26:
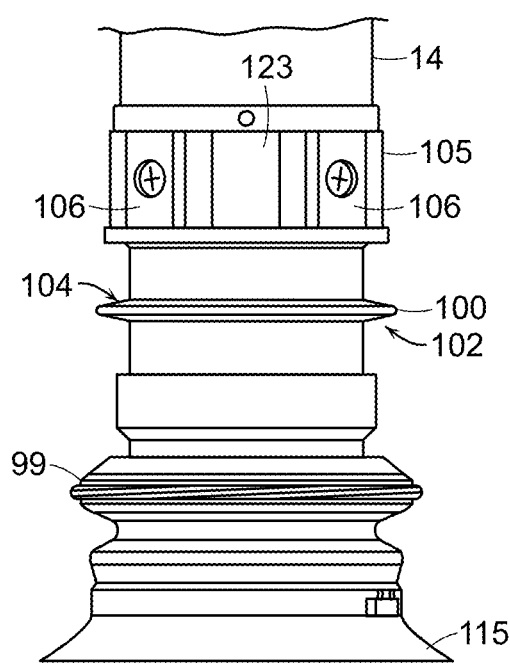
FIG. 26 shows an illustrative diagrammatic side view of the end effector and acquisition unit of FIG. 24 coupled together.
Figure 27:
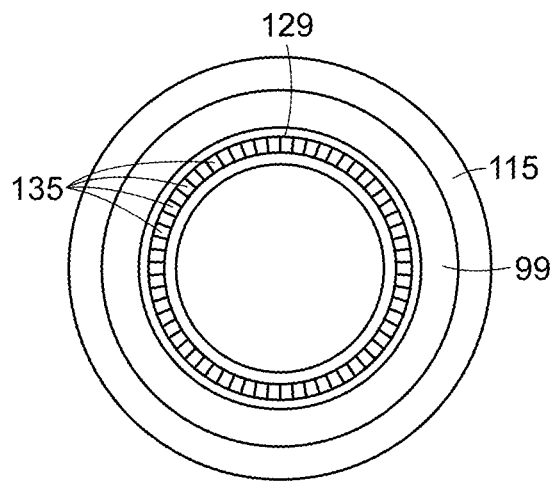
FIG. 27 shows an illustrative diagrammatic top view of the acquisition unit of FIG. 24.

FIGS. 24-27 show an end effector with an acquisition unit identity detection system. In particular, the end effector 14 includes an identity detection unit 123 that includes on a bottom surface 125 thereof, one or more detectors 127 (e.g., cameras or a scanners) that detects the identifying indicia 135 of a top surface 129 of the acquisition unit. FIG. 24 shows a side view of the identity detection unit and FIG. 25 shows a bottom view of the identity detection unit as it faces the acquisition unit. FIG. 26 shows the acquisition unit coupled to the end effector, and FIG. 27 shows a top view of the acquisition unit, with the top surface 129 and identifying indicia 135 as well as the bellows portion 99 and the opening portion 115 of the end effector. The system may thereby confirm the identity of an acquisition unit is coupled to the end effector.

Figure 28:
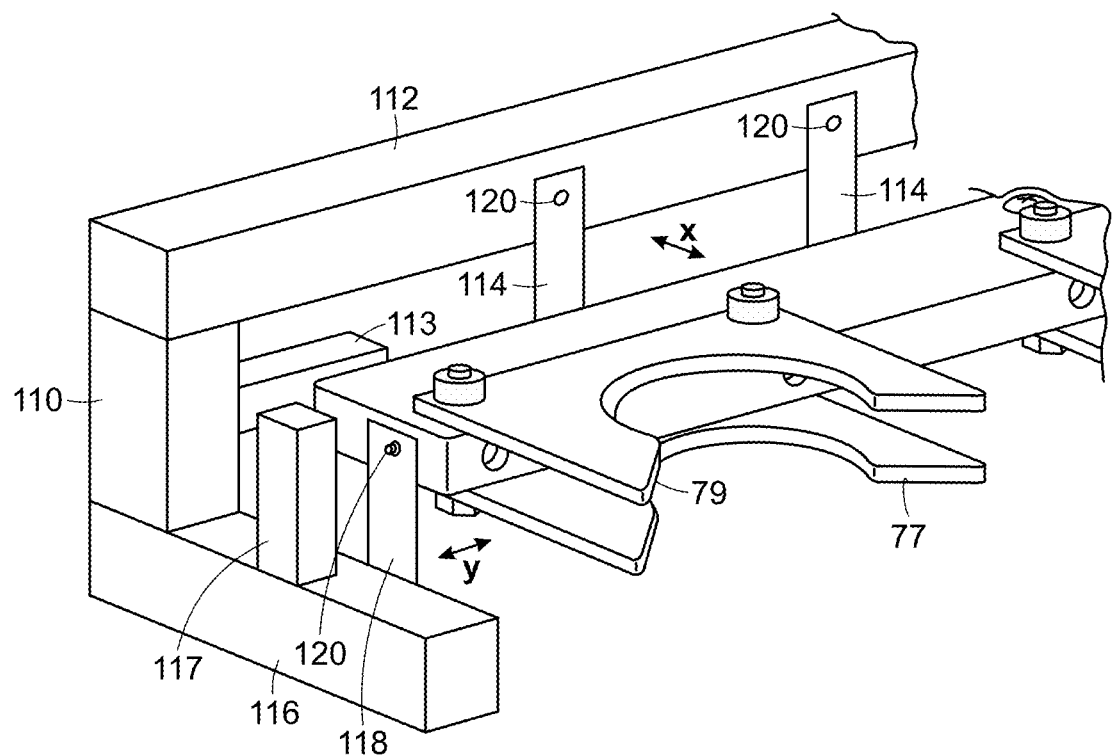
FIG. 28 shows an illustrative diagrammatic view of the exchange station portion of FIG. 13 mounted in an x-y movement accommodation structure.

Further flexibility may be built into systems of the invention by providing that the bracket rack 78 may be mounted to a frame 110 that includes a first beam 112 that extends in a first direction along the rack 78, and is coupled to the rack by spring elements 114 as shown in FIG. 28. The frame 11 also includes a second beam 116 that extends in an orthogonal second direction, and is coupled to the rack by spring elements 118. The spring elements 114, 118 provide that the rack 78 may move in two mutually orthogonal directions (x and y as shown) by permitting the spring elements to flex, and by providing that the spring elements may pivot about mounting posts 120. In particular, when spring elements 114 are flexed, the mount 120 on spring element 118 will permit spring elements 118 to pivot, accommodating the movement in the x direction. When spring elements 118 are flexed, the mount 120 on spring element 114 will permit spring elements 114 to pivot, accommodating the movement in the y direction. While only a portion of the frame 110 and the rack 78 are shown, it will be understood that at least two spring elements 118 are used (on either end of the rack), and any number of two or more spring elements 114 should be used. Movement in the x direction may be limited by hard stops 113 on at least either end of the rack (one such x direction hard stop is shown). Movement in the y direction may be limited by hard stops 117 on at least either end of the rack (one such y direction hard stop is shown).

Figure 29:
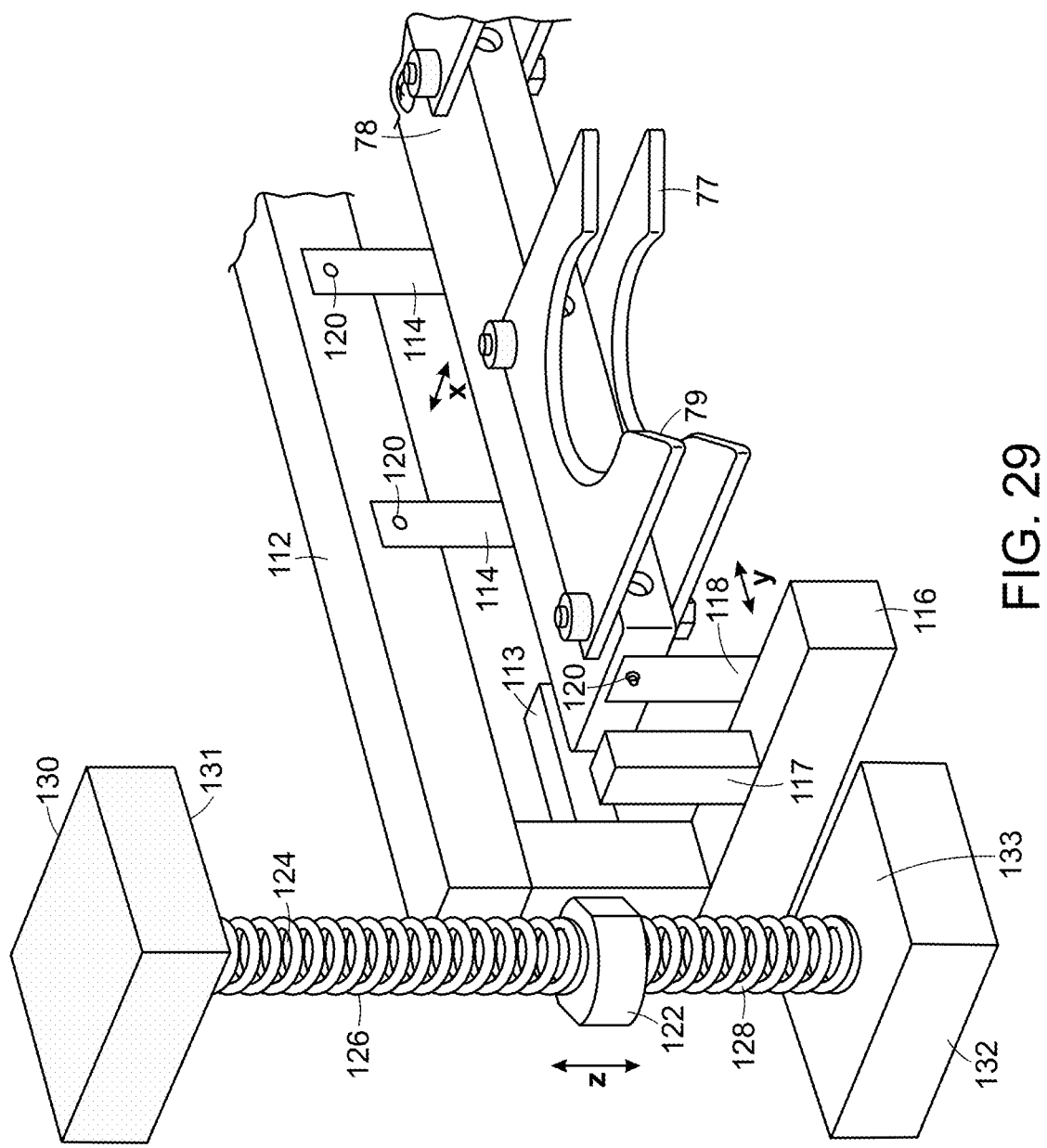
FIG. 29 shows an illustrative diagrammatic view of the exchange station portion of FIG. 13 mounted in an x-y-z movement accommodation structure.

FIG. 29 shows an embodiment of the present invention that is similar to that shown in FIG. 28 and discussed above, wherein the frame 110 is coupled to at least two anchors 122 (only one is shown), and the anchors 122 slide along a vertical member 124 within springs 126, 128. The vertical member 124 is captured between braces 130, 132, and the movement of the springs 130, 132 provides that the frame 110 may be moved in a third (z) direction as shown. The spring elements 114, 118 function as discussed above, and the loose fitting of the anchor 122 around the vertical member 124 permits these elements to accommodate movement of the frame (and rack) in the x and y directions. When the frame 110 (and the rack 78) move upward, spring 126 is compressed, and when the frame 110 moves downward, spring 128 is compressed. Again, movement in the x direction may be limited by hard stops 113 on at least either end of the rack (one such x direction hard stop is shown), and movement in the y direction may be limited by hard stops 117 on at least either end of the rack (one such y direction hard stop is shown). Movement in the z direction may be limited by hard stops provided by the underside of 131 of brace 130, and by the upper-side 133 of brace 132. In alternate embodiments, the movement in the z direction may effectively be limited by providing a relatively high spring constant of the springs 126 and 128 on at least either end of the rack (one such x direction hard stop is shown). Again, two such z direction movement systems may be provided on either end of the rack 78.

The systems of FIGS. 28 and 29 therefore provide that when a robotic system is positioning a retention device (e.g., a vacuum cup) either onto the rack or seeking to remove a retention device from the rack (changing a cup), small misalignments between the end effector and the rack (in x and y directions in FIG. 28, and in x, y and z directions in FIG. 29), will be accommodated without damaging the rack. The accommodation may be provided by both the rack and/or the end effector as discussed above. Such movements do have stop limits to protect against damage.

Figure 30:
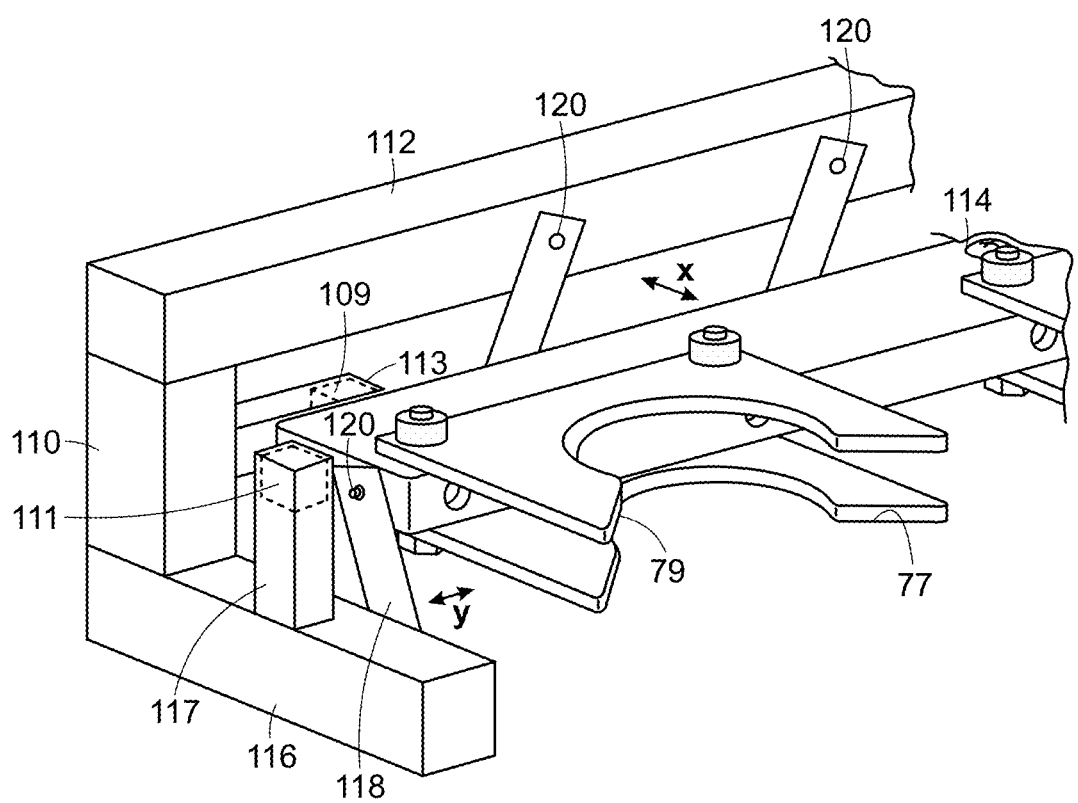
FIG. 30 shows an illustrative diagrammatic view of an exchange station portion mounted in an x-y movement accommodation structure that includes an x-y position zeroing system.

FIG. 30 shows a system similar to the system of FIG. 28 where like reference numerals refer to the same components, and further wherein the system includes both an x-position zeroing system and a y-position zeroing system. The x-position zeroing system may include a spring or other biasing system, or a selectively actuated electromagnet 109 that, when activated, draws the magnetic rack toward the electromagnet 109 as shown in FIG. 30. Similarly, the y-position zeroing system may include a spring or other biasing system, or a selectively actuated electromagnet 111 that, when activated, draws the magnetic rack toward the electromagnet 111 as shown in FIG. 30.

Figure 31:
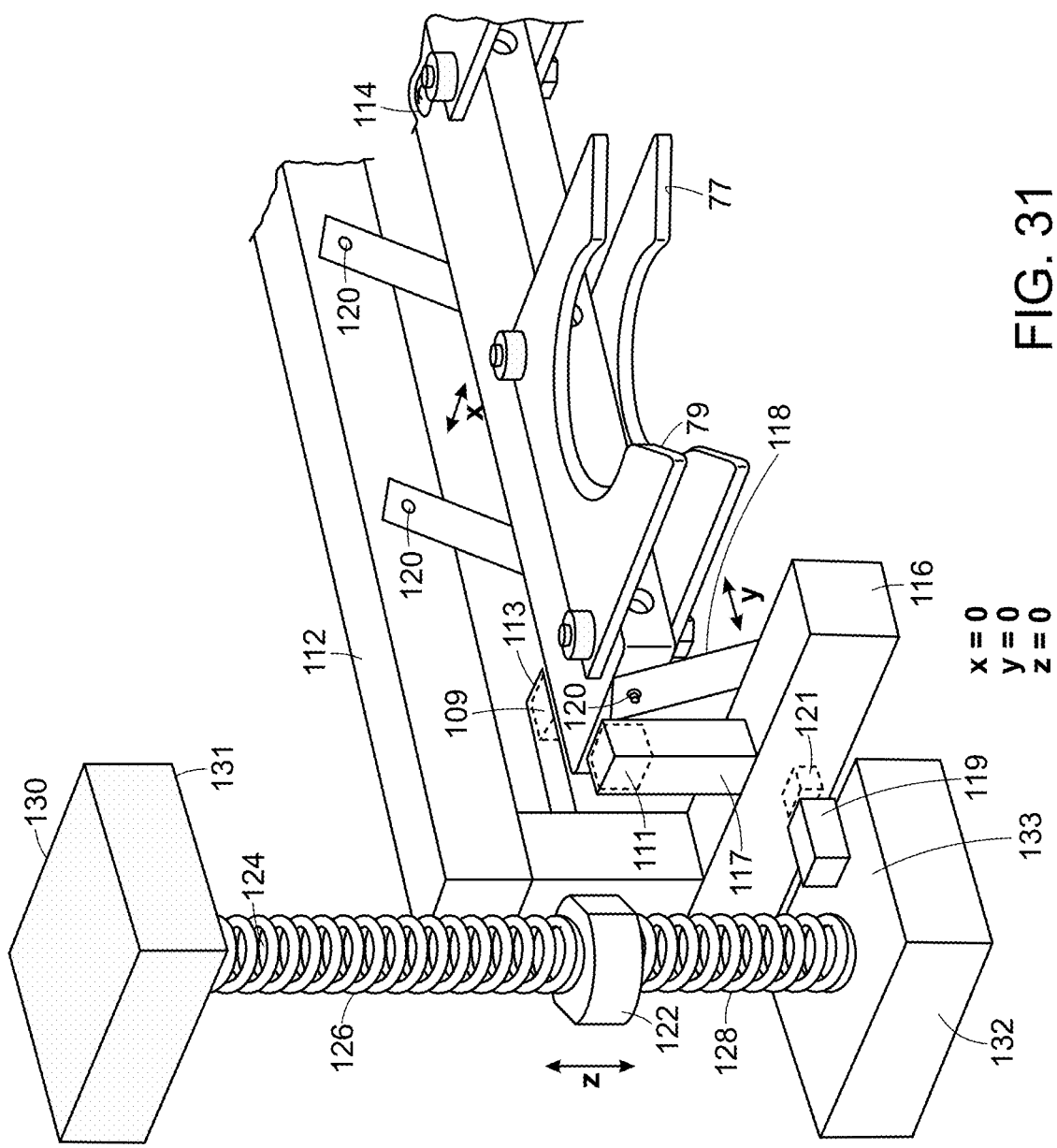
FIG. 31 shows an illustrative diagrammatic view of an exchange station portion mounted in an x-y-z movement accommodation structure that includes an x-y-z position zeroing system.

FIG. 31 shows a system similar to the system of FIG. 29 where like reference numerals refer to the same components, and further wherein the system includes an x-position zeroing system, a y-position zeroing system and a z-position zeroing system. The x-position zeroing system and the y-position zeroing system as discussed above with reference to FIG. 30, and the z-position zeroing system may include a spring or other biasing system, or a selectively actuated electromagnet 119 that, when activated, draws either the second beam 116 (if ferromagnetic) or a ferromagnetic element 121 within the second beam 116, toward the electromagnet 119 as shown in FIG. 31.

The x-y position zeroing system of FIG. 30, and the x-y-z position zeroing system of FIG. 31 may be used at times when the programmable motion (e.g., robotic) system needs or would benefit from having the rack 78 in a specific (not floating) position, for example, when acquiring an acquisition unit from the rack 78.

Figure 32:
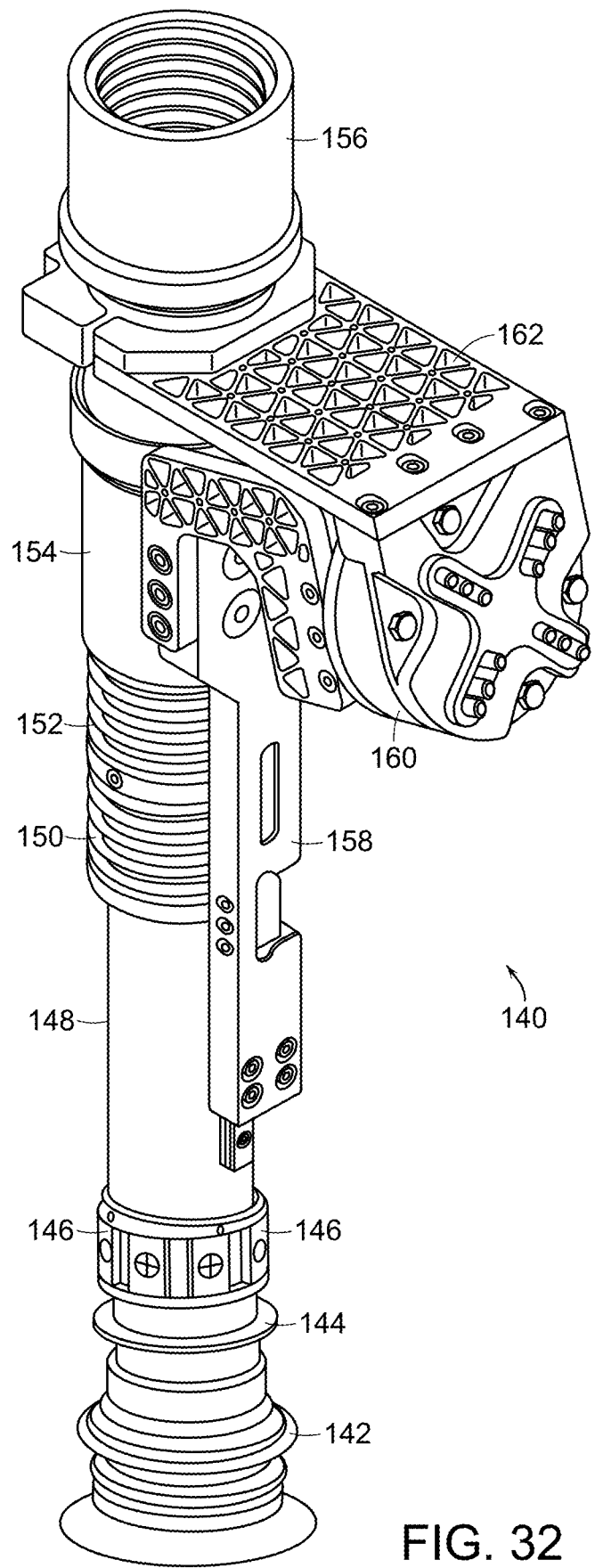
FIG. 32 shows an illustrative diagrammatic view of an end effector including an accommodation structure in accordance with a further embodiment of the present invention.
Figure 33:
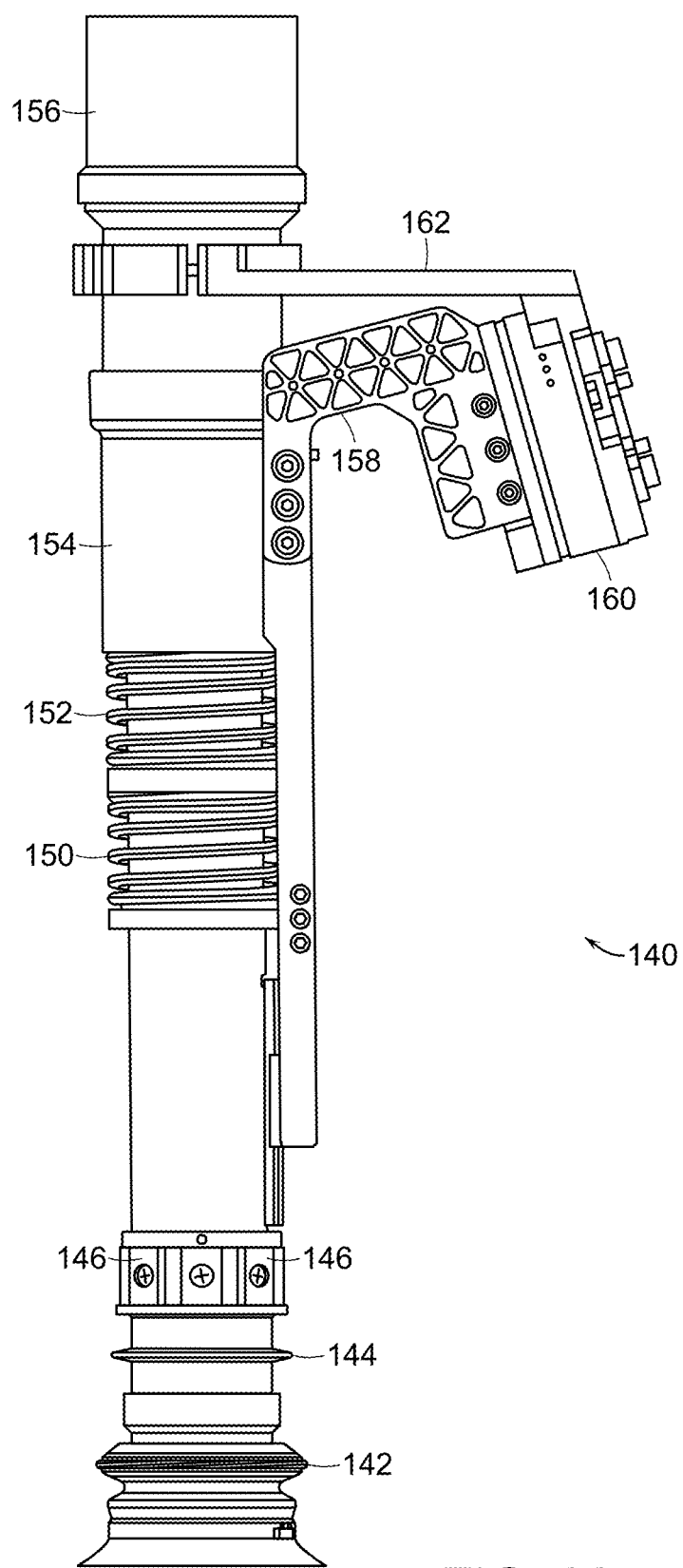
FIG. 33 shows an illustrative diagrammatic side view of the end effector of FIG. 32.

FIGS. 32 and 33 show an end effector 140 in accordance with a further embodiment of the invention that may be used interchangeably with the acquisition units 72, 74, 76 discussed above to provide accommodation of the end effector. The acquisition unit 142 includes a rim 144 for engaging brackets on a rack as discussed above, and the end effector includes a set of retention magnets 146 on a distal end of a conduit 148. The system also includes springs 150 152 that permit the conduit 148 to undergo spring biased linear movement with respect to an end effector base 154. The end effector 140 also includes a low profile load cell or force torque sensor 160 mounted on a load cell or force torque sensor bracket 158. The low profile load cell or force torque sensor is electrically coupled to the processing system 34, and provides data regarding forces that are undergone by the acquisition unit while attached to the end effector. The portion 156 that couples to a vacuum line, is also mechanically isolated from the conduit 148 by being attached to a vacuum plate that is coupled to the non-end-effector side of the load cell or force torque sensor, where the end effector is coupled to the articulated arm. The use of this arrangement and the vacuum plate 162 provides that any strains or forces from the vacuum line (as with either robotic arm is moved or as the vacuum line may be moved or not permitted to move), such strains or forces will not be transmitted to the acquisition device nor to the low profile load cell or force torque sensor.

Figure 34:
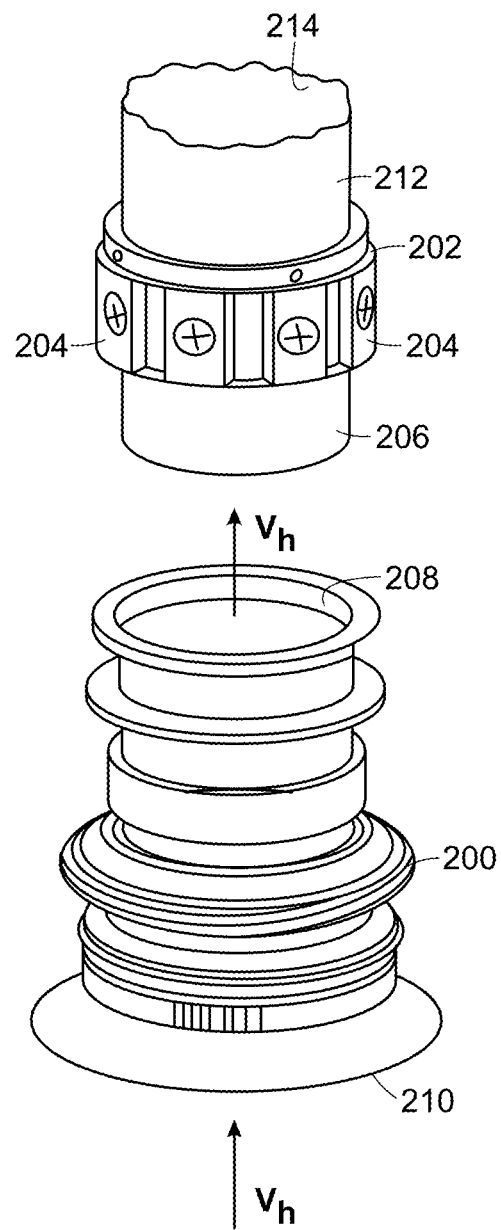
FIG. 34 shows an illustrative diagrammatic view of an end effector and an acquisition unit with a vacuum passing therethrough.

Systems of certain embodiments of the present invention provide that an acquisition unit, such as a vacuum cup (e.g., a flexible bellows type vacuum cup), through which a high vacuum may be designed to flow, may be exchanged for another vacuum cup during use, by the programmable vacuum device. In particular, and with reference to FIG. 34, a high flow vacuum may be provided to flow through an acquisition unit 200 from a base 210 up through an opening 208. When coupled to an end effector that includes a coupling unit 202 (having magnets 204), a collar 206 and a conduit of the end effector 212, the high flow vacuum is maintained through the end effector, and in particular, through the interior 214 of the conduit 212. Again, the coupling unit 202 couples the end effector 212 to the acquisition unit by having the magnetic field created by the magnets 204 pull the ferromagnetic top portion 216 of the acquisition unit 200 toward the coupling unit 204, such that the collar 206 of the end effector is engaged within the interior of the acquisition unit 200 when the acquisition unit 200 is engaged with the end effector 212. Both before and after coupling, a high flow vacuum ($V_h$) is permitted to flow through the units as shown.

Figure 35:
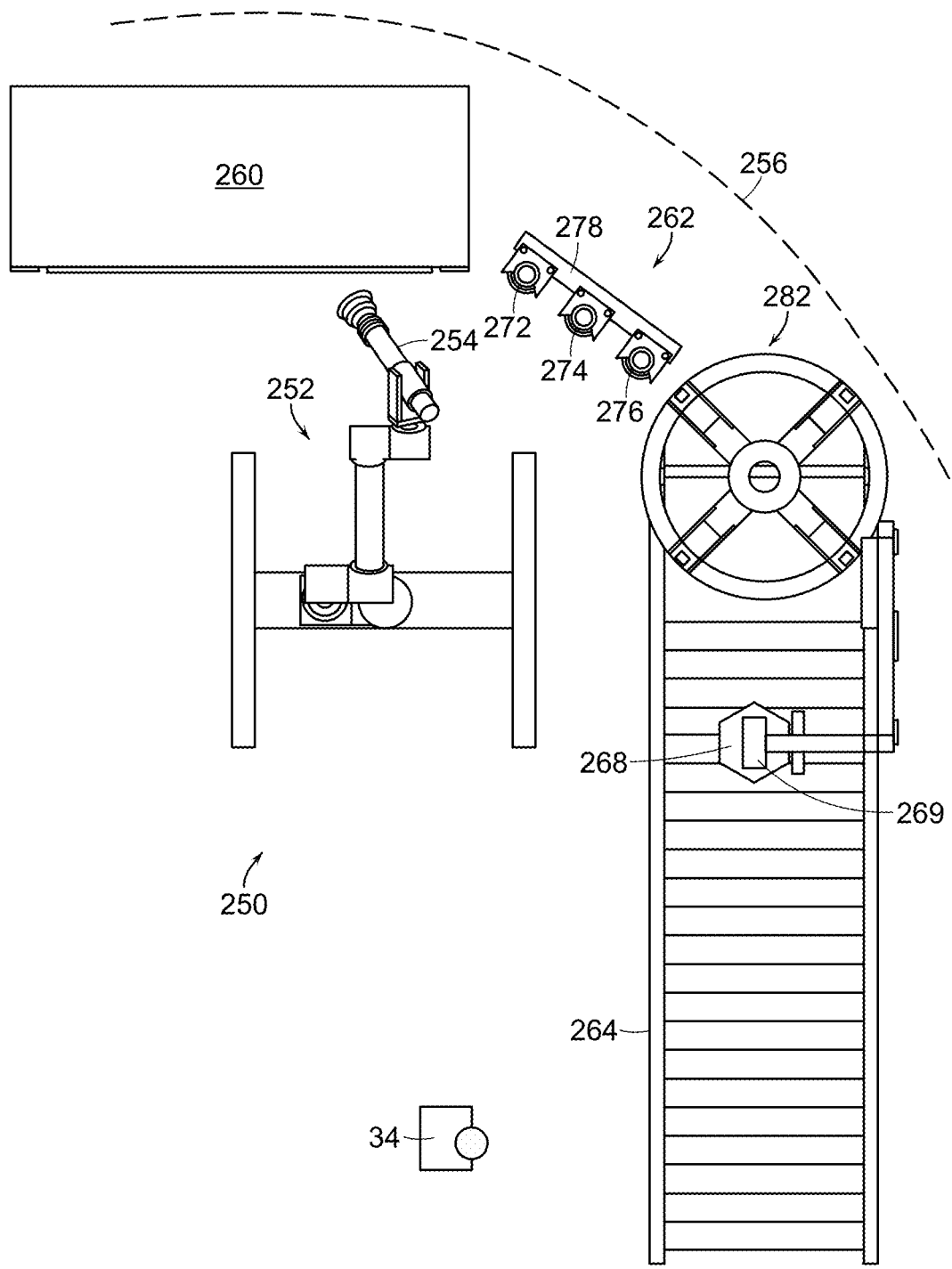
FIG. 35 shows an illustrative diagrammatic plan view of a processing system in accordance with an embodiment of the present invention.

FIG. 35 shows a diagrammatic view of a system 250 in accordance with an embodiment of the present invention. The system 250 includes a programmable motion device 252 (such as a robotic unit) that includes an end effector 254 for grasping and moving objects. The end effector 254 on the programmable motion device 252 may have a reach as far as an arc as generally shown at 256. Within this reach 256, the end effector 254 of the programmable motion device 252 may reach destination bins 260 (such as shown at 30 in FIG. 1), may reach perception station 282, may reach the conveyor 258 (such as shown at 22 in FIG. 1) and destination bins 260, and may reach a vacuum cup changer station 262 including a cup changer rack 278 that includes vacuum cups 272, 274, 276. The system may also include a touch input screen 280 as discussed above (with reference to touch input screen 28 in FIG. 1). The system further provides that the programmable motion device may identify an object in the bin 260 (using the perception unit 268 or by moving the object to the perception station 282), select an appropriate acquisition device from the cup changer rack 278, acquire the selected acquisition device from the cup changer rack 278, and then grasp the identified object in the bin 260 for movement to the destination bins 260. The system therefore provides that the programmable motion device may not only access the objects to be processed and the destination bins, but may also access a vacuum cup changer station at which vacuum cups may be changed during processing based on object identification information detected by the perception unit 26, 268 or the perception unit 29, 282.

If an object is identified by the perception unit 282 that requires a different vacuum cup than is currently attached to the end effector, the end effector may place the object back into the bin so that the object may be again grasped, but by a newly attached acquisition device. In certain embodiments, the perception unit 268 may sufficiently identify a next object, and if the vacuum cup on the end effector needs to be changed, the system may exchange a current vacuum cup to a desired one that is known to be a better acquisition unit for grasping the identified object in bin 260.

The system may further seek to identify all objects in a bin 260, may associate each with an optimal vacuum cup, and may then seek to grasp, one at a time, each of the objects associated with a common vacuum cup prior to changing the vacuum cup on the end effector. In each of these embodiments, the system itself identifies the need to change acquisition units, and then changes acquisition units by itself in the normal course of operation.

Systems of certain embodiments of the invention may also employ machine learning to improve performance over time. The system provides the performance of picking as a function of item, pick station and handling parameters. Further, objects that have not yet been picked will periodically be encountered. It is likely, however, that new objects that are similar to previously picked items, will have similar performance characteristics. For example, object S may be a kind of shampoo in a twenty ounce bottle, and object C may be conditioner in a twenty ounce bottle. If distributed by the same company, then the shape of the bottles may be the same. Systems of embodiments of the invention include processes that use observations of past performance on similar items to predict future performance, and learn what characteristics of the items available to the system are reliable predictors of future performance.

In accordance with certain embodiments, the system provides a learning process that (a) extrapolates the performance of newly seen objects, and (b) is continually updating the data with which it learns to extrapolate so as to continually improve performance. The potential pick parameters are diverse. Several controllable pick parameters may govern the process, such as, which picking stations can pick a given item, which effectors (vacuum cup size or gripper type) are effective for that item, and what rules might be used to choose locations on an item to grasp etc. Because these process parameters can change on a per-SKU basis, and will determine the efficacy and speed of a picking station and further may be determined on a per-SKU basis, it is necessary to estimate these parameters correctly. In particular, the correct values of process parameters depend on the nature of the item, its weight and size, its packaging, its material properties such as whether it is deformable or clear, whether vacuum grippers are effective at holding it, where good grasp locations are on the object, and whether it is easily damaged.

In many operating conditions however, this can be challenging, as new SKUs may be present, which means that for a new object, there is no known set of parameters available. While these parameters will be learned from repeated interactions with the object, this can slow down handling time considerably. To speed up the time it takes to learn the appropriate parameters, using previously recorded data based on similar SKUs can be useful.

In accordance with various embodiments, the invention provides processes for an automated material handling system that routes bins to picking stations, and which provides the following. The system may predict object-specific parameters for new objects based on previously seen objects. For new objects similar to previously handled objects, the processes predict what are expected to be good routing and handling parameters. In this instance an object is readily recognized as being quite similar to objects with which the system has extensive experience. From the bar code or SKU number or product category or description text or from appearance or other features, the system might recognize the object and index information in the database, which might include process parameters, or will at least include information from which process parameters can be determined with high confidence.

Further, the system may explore the parameter space for completely unknown objects. For new objects that are not sufficiently similar to any previously handled objects, the system may propose multiple candidate routing and handling parameters with the aim of finding good routing and handling parameters. When an unfamiliar object is first introduced, process parameters must be determined.

The system may also update predictive models of object-specific handling performance from observed item handling performance. Processes refine the routing and handling parameters on an object basis, as experience with that object is gained. The predictive model is refined as experience is gained.

The system may further update predictive models of object-to-object similarity from observed object handling performance. The parameters affecting the schemes and processes for classifying and/or clustering objects are refined as experience with all available items is increased. Further, the system may recognize and correct for persistent discrepancies in actual versus predicted performance. Some objects, when replenished by the manufacturer, have different weights, packaging or other characteristics that impact the object's handling performance. Old routing and handling parameters that yielded good performance before may be inappropriate for the changed object. When the actual performance repeatedly exceeds the range of the predicted performance, the system favors exploration of the parameter space.

Figure 36A:
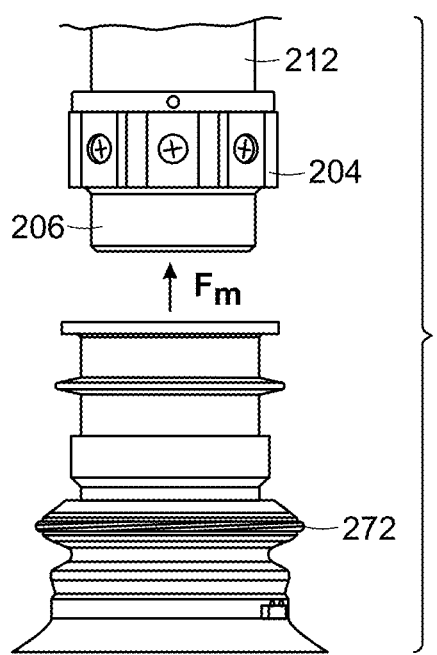
FIGS. 36A-36D show illustrative diagrammatic views of an acquisition unit being coupled to an end effector (FIGS. 36A and 36B), engaging an object (FIG. 36C), and transferring the acquisition unit to an exchange station (FIG. 36D).
Figure 36B:
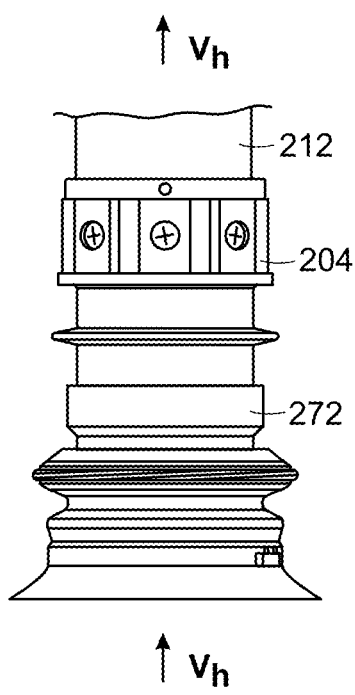
Figure 36D:
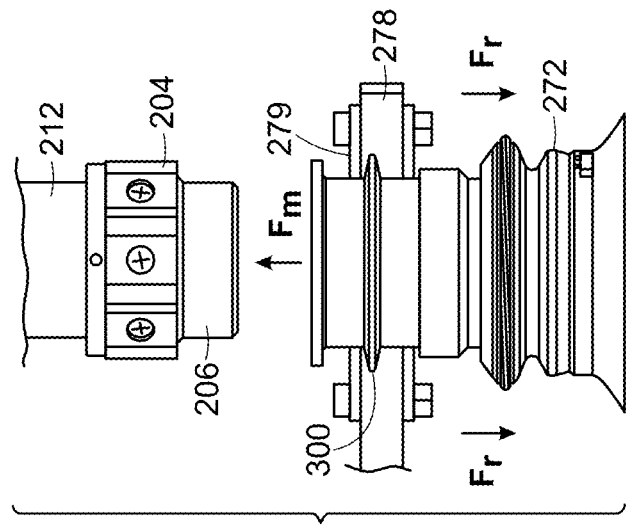
Figure 36C:
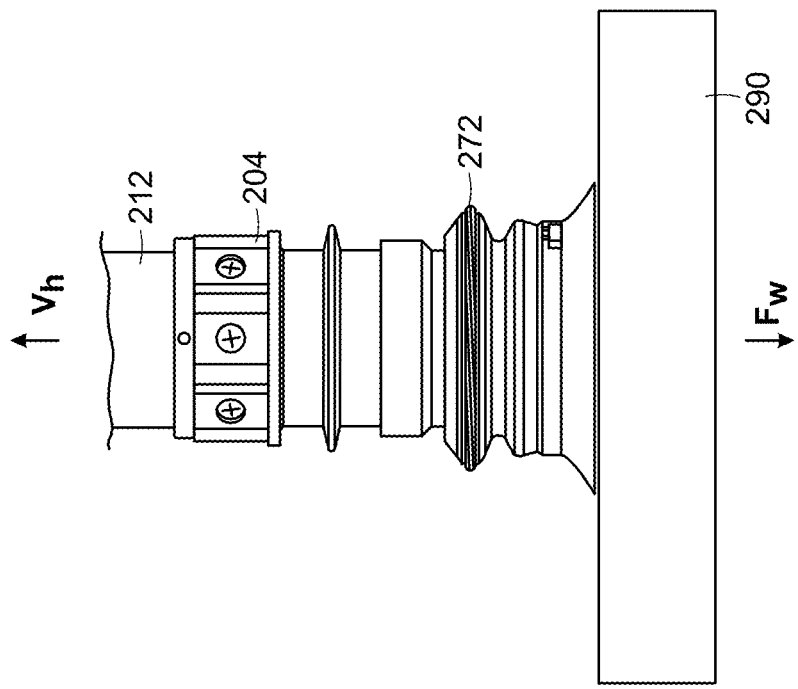

The coupling of the different vacuum cups to an end effector via the magnets also presents fewer limitations on the lifting dynamics. In particular, and with reference to FIGS. 36A-36D, the coupling unit 204 attached to the conduit 212 is drawn toward the ferromagnetic top 208 of the vacuum cup 272 by a magnetic field Fm as shown in FIG. 36A. Because the object when lifted does not hang from the vacuum cup (but rather is drawn by the vacuum $V_h$), the strength of the magnetic field is less of a factor in the grasping and lifting. In particular, and with reference to FIGS. 36B and 36C, the object is lifted by the force of the vacuum (e.g., a high flow vacuum) $V_h$, which as discussed above, flows through both the vacuum cup 272 and the conduit 212. It is the vacuum $V_h$ that is used to grasp an object 290 as shown in FIG. 36C. Although the grasping is not reliant on the magnetic field $F_m$, the strength of the magnetic field $F_m$ may become a factor if the weight of the object 290 (or its effective movement force due to acceleration) is closely matched to the lifting force created by the vacuum force of $V_h$, to lift the object 290. This is due to atmospheric pressure both being applied to the object and being applied to the vacuum cup (and in particular to any radially outwardly extending flanges) while a vacuum exists within the cup. Adjusting the strength of the magnetic field may minimize this. Adjusting the shape of the vacuum cup may also help minimize this, for example, by providing for parallel walled cups or cups that include radially inwardly sloping walls toward the object engagement surface.

In accordance with further embodiments of the invention, it may be desirable to design the vacuum cup such that any seal between the cup and an object will become compromised in the event that too large a weight is attempted to be lifted (protecting the magnetic coupling from being breached or protecting the articulated arm from overload). Such vacuum cups may, for example, permit some portions of the cup to open or otherwise break the seal between the cup and the object, thereby releasing the object from the vacuum cup.

Upon returning a vacuum cup 272 to a rack 278, the vacuum cup is placed on the rack as discussed above, and the coupling unit 204 and conduit 212 are pulled upward away from the rack. The rim 300 of the vacuum cup 272 is stopped by the underside of the upper bracket 279 as discussed above, and the vacuum cup 272 is separated from the coupling unit 204 and conduit 212 when the reactive force of the rack $F_r$ overcomes the magnetic force $f_m$ as shown in FIG. 36D.

Those skilled in the art will appreciate that numerous modifications and variations may be made to the above disclosed embodiments without departing from the spirit and scope of the present invention.

What is claimed is:

1. A programmable motion system comprising:
    an acquisition unit rack that provides access to a plurality of acquisition units that are provided within access to a robotic arm having an end effector, wherein the acquisition unit rack comprises shaped portions for holding the plurality of acquisition units, each acquisition unit being adapted to grasp an object when attached to the end effector of the robotic arm;
    a force accommodation system for permitting the rack to move in any of three mutually orthogonal directions responsive to forces applied to the rack by the end effector of the robotic arm as the robotic arm is exchanging an acquisition unit with the acquisition unit rack; and
    a zeroing system for returning the rack to a zero position in each of the three mutually orthogonal directions when the forces are no longer applied to the rack by the end effector of the robotic arm, wherein the zeroing system includes a plurality of magnets for providing a defined home position for the rack in each of the three mutually orthogonal directions.

2. The programmable motion system of claim 1, wherein each of the plurality of acquisition units includes an open interior through which a vacuum force may be applied to an opening of each acquisition unit.

3. The programmable motion system of claim 2, wherein each of the plurality of acquisition units includes a flexible bellows.

4. The programmable motion system of claim 2, wherein the end effector includes a conduit for coupling a vacuum source to a distal end of the end effector.

5. The programmable motion system of claim 4, wherein the conduit is linearly slidable with respect an end effector base that is coupled to the robotic arm.

6. The programmable motion system of claim 1, wherein each acquisition unit is magnetically attachable to the end effector of the robotic arm.

7. The programmable motion system of claim 1, wherein the shaped portions of the acquisition unit rack include a first retention member associated with each acquisition unit for retaining each acquisition unit on the rack when the end effector is moved away from the rack.

8. The programmable motion system of claim 7, wherein the shaped portions of the acquisition unit rack include a second retention member associated with each acquisition unit on which each acquisition unit rests when not engaged with the end effector.

9. The programmable motion system of claim 1, wherein the force accommodation system includes springs for accommodating movement of the rack.

10. A programmable motion system comprising:
- an acquisition unit rack that provides access to any of a plurality of acquisition units that are provided within access to a robotic arm having an end effector, wherein the acquisition unit rack comprises a plurality of shaped portions for passively retaining the plurality of acquisition units, each acquisition unit being adapted to grasp an object when attached to the end effector of the robotic arm;
- a force accommodation system comprising a frame and a plurality of springs, wherein the rack is mounted to the frame by the plurality of springs such that the rack is permitted to move in any of three mutually orthogonal directions responsive to forces applied to the rack by the end effector of the robotic arm as the robotic arm is exchanging the acquisition unit passively retained by the acquisition unit rack; and
- a zeroing system comprising a plurality of magnets for returning the rack to a defined home position relative to the frame in each of the three mutually orthogonal directions when the forces are no longer applied to the rack by the end effector of the robotic arm.

11. The programmable motion system of claim 10, wherein each acquisition unit includes an open interior through which a vacuum force may be applied to an opening of the acquisition unit.

12. The programmable motion system of claim 11, wherein each acquisition unit includes a flexible bellows.

13. The programmable motion system of claim 11, wherein the end effector includes a conduit for coupling a vacuum source to a distal end of the end effector.

14. The programmable motion system of claim 13, wherein the conduit is linearly slidable with respect to an end effector base that is coupled to the robotic arm.

15. The programmable motion system of claim 10, wherein each acquisition unit is magnetically attachable to the end effector of the robotic arm.

16. The programmable motion system of claim 10, wherein the shaped portion of the acquisition unit rack includes a first retention member associated with each acquisition unit for retaining the acquisition unit on the rack when the end effector is moved away from the rack.

17. The programmable motion system of claim 16, wherein the shaped portion of the acquisition unit rack includes a second retention member associated with the acquisition unit on which the acquisition unit rests when not engaged with the end effector.

18. A method of exchanging an acquisition unit between an end effector of a programmable motion system and an acquisition rack, said method comprising:
- providing the acquisition unit rack with shaped portions for holding a plurality of acquisition units proximate the programmable motion device, each of the plurality of acquisition units being adapted to grasp an object when attached to the end effector of the robotic arm;
- permitting the rack to move in any of three mutually orthogonal directions responsive to forces applied to the rack by the end effector of the robotic arm as the robotic arm is exchanging the acquisition unit of the plurality of acquisition units with the acquisition unit rack; and
- returning the rack to a zero position in each of the three mutually orthogonal directions when the forces are no longer applied to the rack by the end effector of the robotic arm, wherein the zero position is a defined home position for the rack in each of the three mutually orthogonal directions using a plurality of magnets.

19. The method of claim 18, wherein the acquisition unit includes an open interior through which a vacuum force may be applied to an opening of the acquisition unit.

20. The method of claim 19, wherein the acquisition unit includes a flexible bellows.

21. The method of claim 19, wherein the end effector includes a conduit for coupling a vacuum source to a distal end of the end effector.

22. The method of claim 21, wherein the conduit is linearly slidable with respect to an end effector base that is coupled to the robotic arm.

23. The method of claim 18, wherein the acquisition unit is magnetically attachable to the end effector of the robotic arm.

24. The method of claim 18, wherein the shaped portions of the acquisition unit rack include a first retention member associated with each acquisition unit for retaining the acquisition unit on the rack when the end effector is moved away from the rack.

25. The method of claim 24, wherein the shaped portions of the acquisition unit rack include a second retention member associated with the acquisition unit on which the acquisition unit rests when not engaged with the end effector.

26. The method of claim 18, wherein permitting the rack to move includes permitting the rack to move against springs for accommodating movement of the rack.

* * * * *